(12) United States Patent
Siefker et al.

(10) Patent No.: US 6,606,854 B1
(45) Date of Patent: Aug. 19, 2003

(54) EXHAUST MIXER AND APPARATUS USING SAME

(75) Inventors: Robert G. Siefker, Greenwood, IN (US); Baily Ramachandra Vittal, Carmel, IN (US); Von David Baker, Indianapolis, IN (US); Syed Arif Khalid, Indianapolis, IN (US); James Carl Loebig, Indianapolis, IN (US)

(73) Assignee: Allison Advanced Development Company, Indianapolis, IN (US)

(*) Notice: Subject to any disclaimer, the term of this patent is extended or adjusted under 35 U.S.C. 154(b) by 0 days.

(21) Appl. No.: 09/551,728

(22) Filed: Apr. 18, 2000

Related U.S. Application Data

(63) Continuation of application No. PCT/US00/00098, filed on Jan. 4, 2000.
(60) Provisional application No. 60/114,623, filed on Jan. 4, 1999.

(51) Int. Cl.$^7$ .............................. F02K 1/48; F02K 1/40
(52) U.S. Cl. ..................... 60/262; 60/264; 239/127.3; 239/265.19; 181/213; 181/220
(58) Field of Search .................... 60/262, 264, 266; 239/127.3, 265.17, 265.19, 265.23; 181/213, 220, 218, 221

(56) References Cited

U.S. PATENT DOCUMENTS

| | | | |
|---|---|---|---|
| 3,048,376 A | | 8/1962 | Howald et al. |
| 3,161,257 A | * | 12/1964 | Young .................... 239/265.19 |
| 3,210,934 A | * | 10/1965 | Smale .......................... 60/266 |
| 3,578,106 A | | 5/1971 | Ellis |
| 3,592,291 A | * | 7/1971 | Medawar .................... 181/220 |
| 3,609,968 A | | 10/1971 | Mierley, Sr. et al. |
| 3,613,827 A | * | 10/1971 | Labussiere .................. 181/215 |
| 3,631,678 A | | 1/1972 | Reed |
| 3,693,880 A | * | 9/1972 | Versaw et al. ......... 239/265.19 |
| 3,815,360 A | | 6/1974 | Wellinitz |
| 4,018,046 A | | 4/1977 | Hurley |
| 4,045,957 A | | 9/1977 | DiSabato |
| 4,077,206 A | | 3/1978 | Ayyagari |
| 4,095,417 A | | 6/1978 | Banthin |
| 4,117,671 A | | 10/1978 | Neal et al. |
| 4,136,518 A | | 1/1979 | Hurley et al. |
| 4,147,029 A | | 4/1979 | Sargisson |
| 4,226,085 A | | 10/1980 | Johnson |
| 4,298,089 A | * | 11/1981 | Birch et al. .................. 181/220 |
| 4,302,934 A | | 12/1981 | Wynosky et al. |
| 4,335,573 A | * | 6/1982 | Wright ......................... 60/262 |
| 4,401,269 A | | 8/1983 | Eiler |
| 4,487,017 A | | 12/1984 | Rodgers |
| 4,543,784 A | | 10/1985 | Kirker |
| 4,548,034 A | | 10/1985 | Maguire |
| 4,566,270 A | | 1/1986 | Ballard et al. |

(List continued on next page.)

Primary Examiner—Ted Kim
(74) Attorney, Agent, or Firm—Woodard, Emhardt, Moriarty, McNett & Henry LLP

(57) ABSTRACT

Disclosed is an exhaust mixer (50) including a passage (54) extending from an inlet (56) to an outlet (58) that is coincident with a centerline axis of mixer (50). Several ridges (68) are circumferentially disposed about the axis and each flare away from the centerline axis relative to a direction along the centerline axis from inlet (56) toward outlet (58). Ridges (68) each define a corresponding one of several inner channels (74) radially disposed about passage (54) that each intersect passage (54) between inlet (56) and outlet (58). Several outer channels (84) are also radially disposed about passage(54) and are each positioned between a corresponding pair of inner channels (74). Ridges are each shaped to turn inner channels (74and outer channels (84) about the axis as ridges (68) extend along the indicated direction. Inner channels (74) diverge away from the axis and one another in this direction while outer channels (84) converge toward the axis and one another in this direction.

24 Claims, 20 Drawing Sheets

U.S. PATENT DOCUMENTS

| | | |
|---|---|---|
| 4,576,002 A | 3/1986 | Mavrocostas |
| 4,577,462 A | 3/1986 | Robertson |
| 4,686,826 A | 8/1987 | Koshoffer et al. |
| 5,440,875 A | 8/1995 | Torkelson et al. |
| 5,638,675 A | 6/1997 | Zysman et al. |
| 5,755,092 A | 5/1998 | Dessale et al. |
| 5,761,900 A | 6/1998 | Presz, Jr. |
| 5,775,095 A | 7/1998 | Zysman et al. |
| 6,012,281 A * | 1/2000 | Hauser ........................ 60/262 |
| 6,082,635 A * | 7/2000 | Seiner et al. .......... 239/265.19 |

* cited by examiner

EXHAUST MIXER AND APPARATUS USING SAME

CROSS-REFERENCE TO RELATED APPLICATIONS

The present application claims the benefit of U.S. Provisional Patent Application Serial No. 60/114,623 filed Jan. 4, 1999, which is hereby incorporated by reference, and is a continuation application of International Patent Application No. PCT/US00/00098 filed Jan. 4, 2000.

BACKGROUND

The present invention relates to exhaust mixers, and more particularly, but not exclusively, relates to an exhaust mixer for a gas turbine engine that reduces the visibility of hot parts.

It is often desirable to mix exhaust from a gas turbine engine with cooler air. Such mixing is often utilized to reduce the noise level generated by gas turbine engines—especially those used to propel aircraft. Several devices to facilitate mixing have been developed that are placed in the path of exhaust exiting the engine; however, in many applications, these devices leave room for improvement.

Furthermore, in certain applications, it is desirable to reduce visibility of hot parts of the engine through the mixing device. Alternatively or additionally, it may also be desirable to block view of the hot regions of the device itself.

Accordingly, there is a demand for further contributions in this area of technology.

SUMMARY

One form of the present invention is a mixer with improved line-of-sight blockage.

In an alternative form, an improved mixer has a number of lobes each shaped to block at least a portion of the hot inner surface of the mixer or hot parts of the exhaust portion of an engine coupled to the mixer. Preferably, the lobes are curved in a pattern selected to provide a desired degree of blockage. More preferably, the lobes generally twist about a reference axis corresponding to the mixer, such as the mixer's centerline axis. However, in other embodiments of the present invention, the lobes may be shaped or oriented differently.

In another form, a mixer includes a number of radial lobes that each terminate in a radial end wall or fin. The mixer may include lobes that twist about an axis corresponding to the direction of working fluid flow through the mixer. The walls may include a curved edge to direct working fluid towards a centerline axis of the mixer. However, in other embodiments, the walls may be shaped differently in accordance with the present invention.

In still another form, a mixer is provided that includes a number of radially oriented troughs and a number of structures that each extend from a corresponding one of the troughs toward the centerline of the mixer. These structures may be in the form of fins or vanes that at least partially block hot parts. The mixer may alternatively or additionally include a curved or twisting pattern of the troughs relative to a reference axis to enhance line-of-sight blockage. For embodiments of the present invention including the structures extending toward the center of the mixer, these structures may also be arranged in a curved or twisted pattern.

In a further form, a multilobed mixer includes a number of hollow radial vanes that extend from troughs between adjacent pairs of the mixer lobes toward the center of the mixer to provide cooling fluid. The cooling fluid may be utilized to cool a centerbody of an associated engine. The mixer may additionally or alternatively include a curved or twisting pattern of lobes relative to a reference axis to enhance line-of-sight blockage. For embodiments of the present invention that include the vanes, the vanes may also be oriented or shaped to follow a curved or twisted pattern.

In other forms of the present invention, a mixer according to the present invention may be coupled to an engine used to propel a vehicle. The vehicle maybe an aircraft with the engine being of the gas turbine variety. In other embodiments, the mixer of the present invention is employed with a different vehicle type, such a land vehicle or a vessel that travels on or through the water. Also, a mixer according to the present invention may be utilized with any engine type as would occur to those skilled in the art.

Further forms, embodiments, objects, features, advantages, benefits, and aspects of the present invention shall become apparent from the drawings and description provided herein.

DESCRIPTION OF SELECTED EMBODIMENTS

Figure 1:
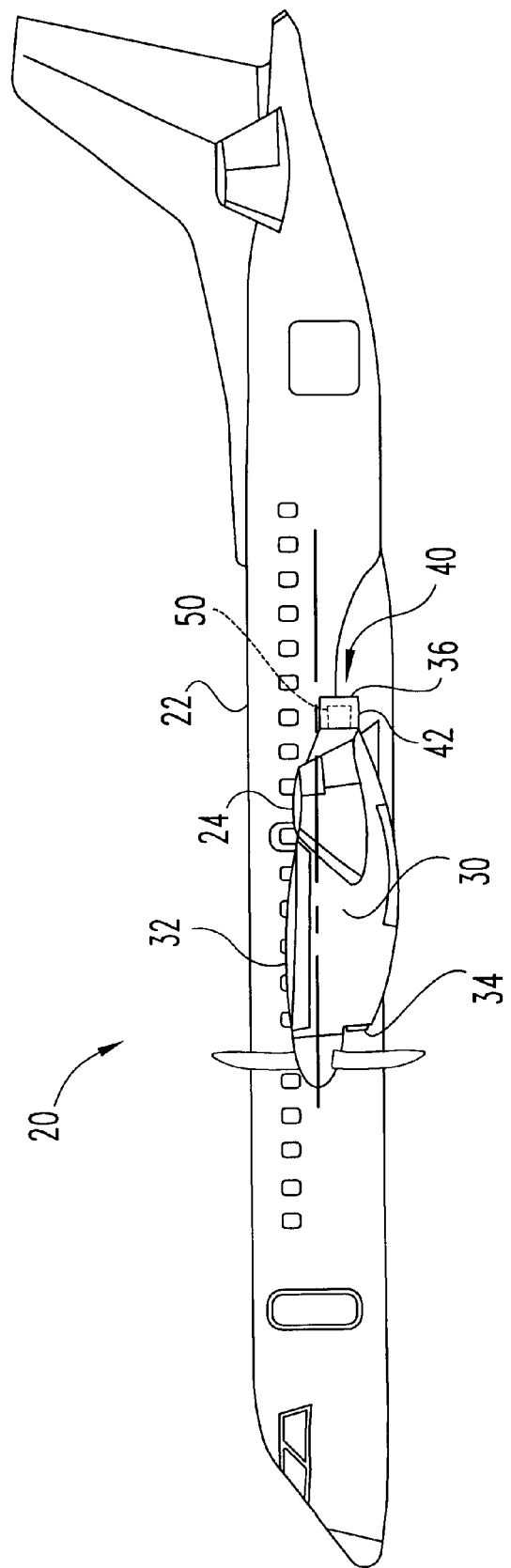
FIG. 1 is a side view of a first embodiment of the present invention.

For the purposes of promoting an understanding of the principles of the invention, reference will now be made to various embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

One embodiment of the present invention is shown in FIG. 1 as aircraft 20. Aircraft 20.includes fuselage 22 and wing 24. Turboprop 30 is mounted to wing 24 and includes gas turbine engine 32 with intake 34. Exhaust produced by engine 32 flows along an exhaust pathway and exits at discharge 36. Mixing system 40 is provided along this exhaust pathway. Mixing system 40 includes duct 42 defining discharge 36, and mixer 50 (shown in phantom) positioned in duct 42.

Figure 2:
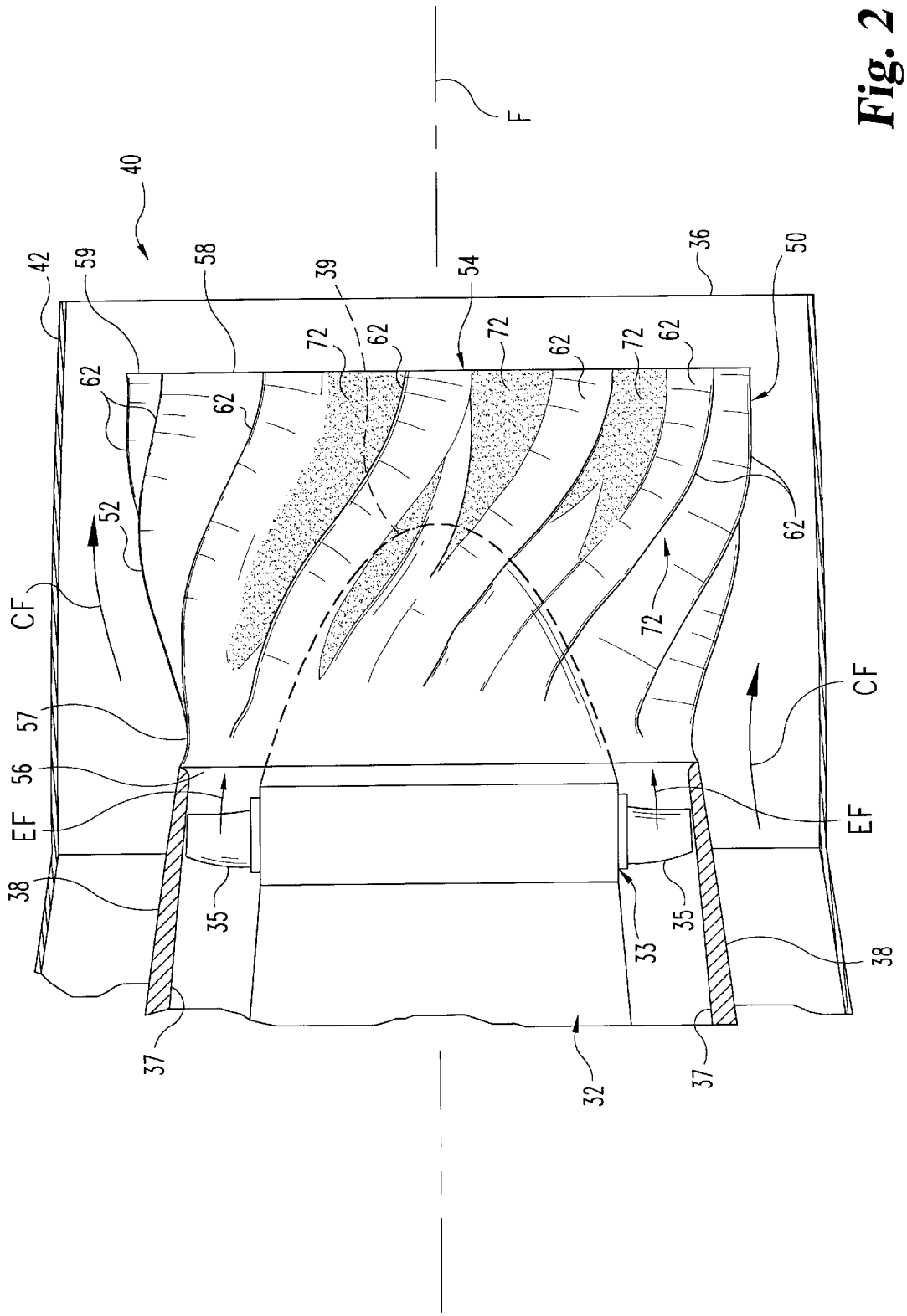
FIG. 2 is a partial sectional, side view of the exhaust mixing system shown in FIG. 1.

Referring additionally to FIG. 2, a partial sectional, side view of mixing system 40 is illustrated. Mixer 50 includes conduit 52 positioned in duct 42 about centerline axis F. Conduit 52 includes passage 54 extending from inlet 56 defined by conduit end portion 57 to outlet 58 defined by conduit end portion 59. Inlet 56 is positioned opposite outlet 58 along axis F, and at least a portion of passage 54 is coincident with axis F, such that axis F passes through the center of inlet 56 and outlet 58. Mixer 50 is coupled to gas turbine engine 32 along axis F. Gas turbine engine 32 is partially shown in FIG. 2 with turbine 33 having blades 35 positioned in annular working fluid passage 37. Passage 37 is defined by engine casing 38. Casing 38 is sized to fit within duct 42 and is coupled to mixer 50 to align inlet 56 with passage 37. Engine 32 is extended by centerbody 39 that enters mixer 50 through inlet 56, and terminates in conduit 52 of mixer 50.

Gas turbine engine 32 operates in the standard manner, receiving air through intake 34 for pressurization by one or more compressors rotating about axis F (not shown). At least a portion of this pressurized air is mixed with fuel to provide a fuel charge that is combusted to release energy in the form of hot, expanding gases. These combustion gases impinge on one or more turbines, such as turbine 33 shown in FIG. 2, causing the one or more turbines to rotate about axis F. The mechanical power provided by turbine rotation is used to do work, such as propel aircraft 20. Also, rotation of each of the one or more compressors is typically maintained by a rotatable coupling to a corresponding turbine; thereby continuing the supply of pressurized air to sustain combustion.

It should be understood that gas turbine engine 32 may include a number of other components that are not shown to enhance clarity. Further, any compressors and/or turbines of gas turbine engine 32 may be of a single or multi-stage variety. Alternatively or additionally, gas turbine engine 32 may include multiple spools each comprised of a compressor rotatably coupled by a shaft to a turbine. In one common "dual spool" configuration, the shafts of two spools are arranged concentric to one another to correspondingly provide a low pressure or fan stage compressor upstream of a high pressure compressor, with a corresponding pair of turbines to drive the low and high pressure stages. In another configuration, gas turbine engine 32 also includes a turbine that is not coupled to a compressor and accordingly is capable of rotating freely relative to any compressor. This free turbine is typically arranged to turn a shaft for delivering mechanical power, and is commonly used in turboprop and helicopter applications.

In still another embodiment, gas turbine engine 32 is arranged to propel a vehicle with the thrust produced by discharging a working fluid jet through a nozzle. Duct 42 can be arranged to provide a suitable nozzle for such embodiments. Indeed, in other embodiments of the present invention, mixing system 40 is used with different varieties of engines either in addition or as an alternative to the gas turbine type. These different types may include pulse detonation engines, wave rotor engines, ram jets, internal combustion engines of the reciprocating piston variety, internal combustion engines of the intermittent Spark Ignition (SI) or Compression Ignition (CI) variety, and/or hybrid combinations of such engine types, just to name a few.

During engine operation, inlet 56 of mixer 50 is arranged to receive hot exhaust gases for intermixing with relatively cooler gases before being discharged through discharge 36. In FIG. 2, the hot exhaust flow from engine 32 is designated by arrows EF. Inlet 56 of passage 54 is in fluid communication with passage 37 to receive exhaust flow EF. An outside stream of cooling fluid, as designated in FIG. 2 by arrows CF, flows between duct 42 and conduit 52 of mixer 50 to be mixed with exhaust flow EF at outlet 58. Typically, this cooling fluid is air from an outside inlet, compressor stage, or fan stage of engine 32.

Figure 3:
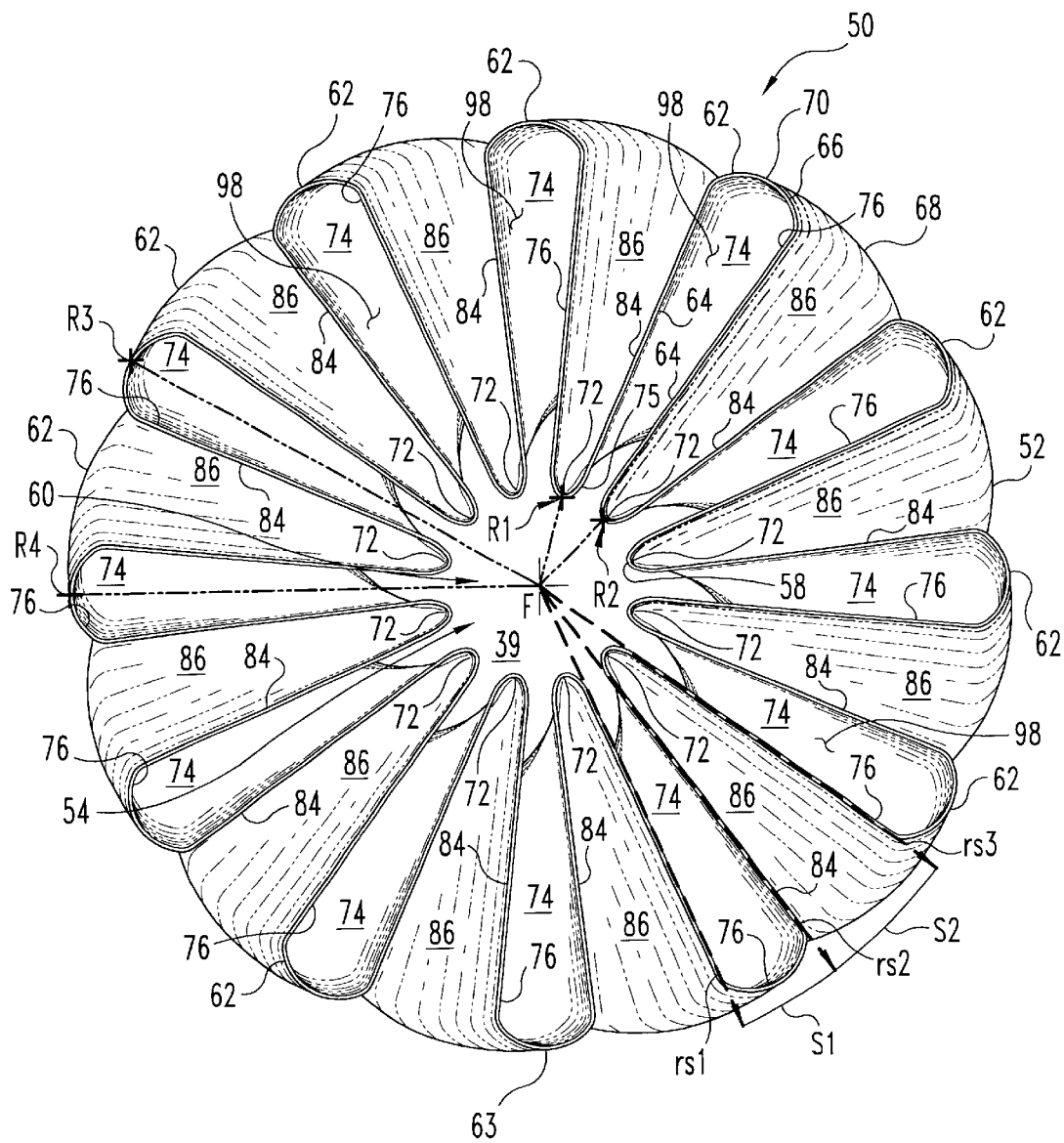
FIG. 3 is an end, elevational view of the exhaust mixer shown in FIG. 2.
Figure 4:
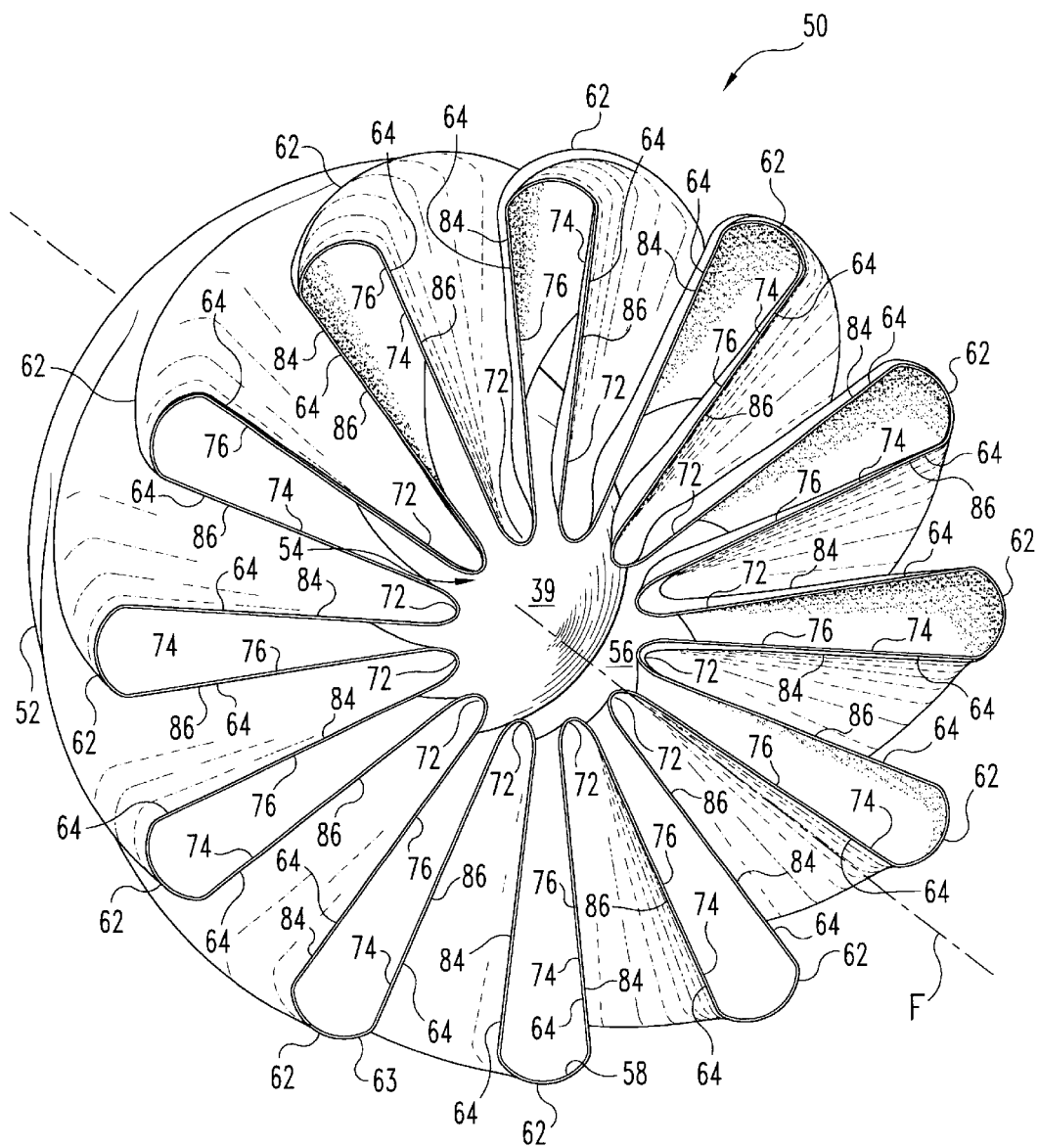
FIG. 4 is a top left, isometric view of the exhaust mixer shown in FIG. 2.
Figure 5:
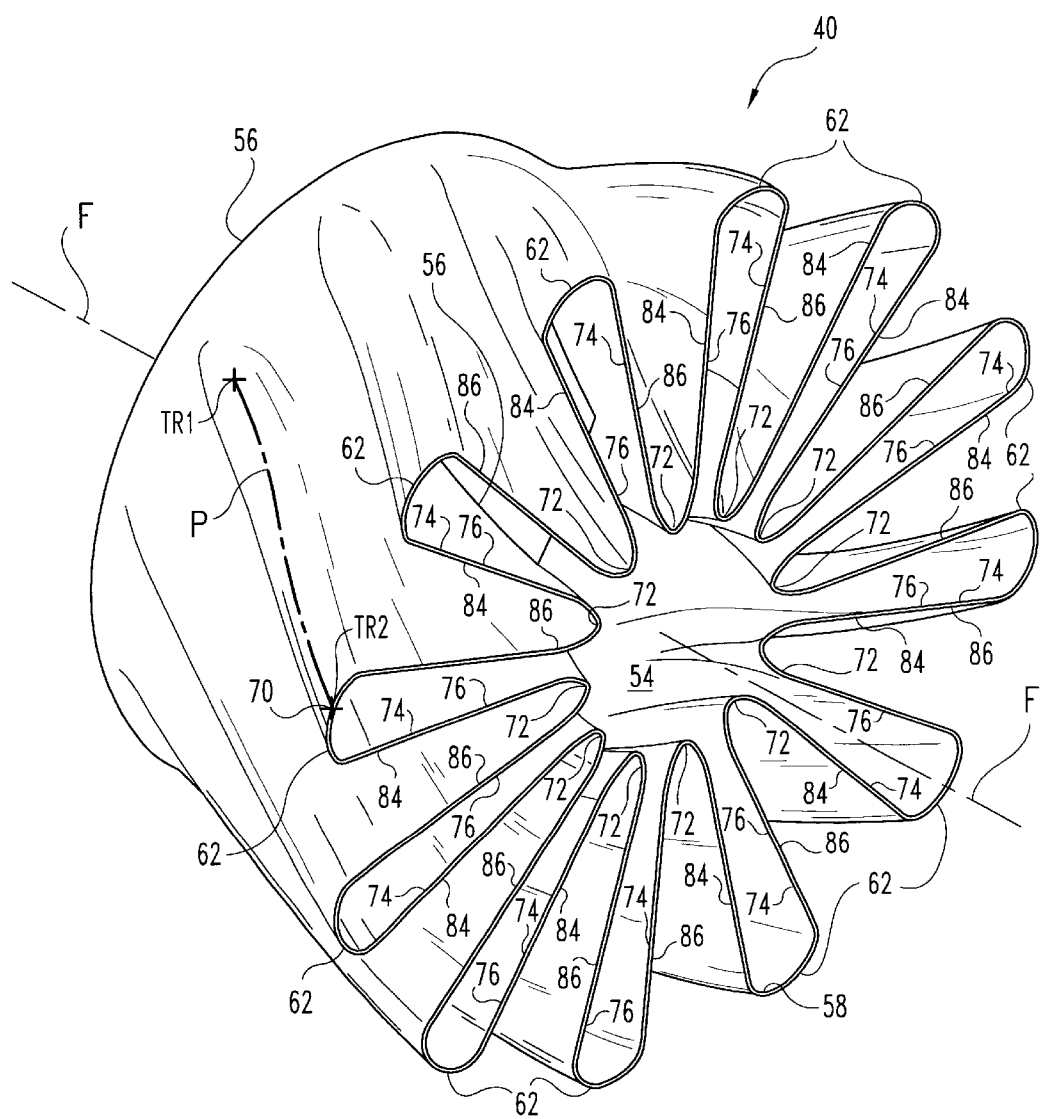
FIG. 5 is a top left, perspective view of the exhaust mixer shown in FIG. 2 along a different line of sight than FIG. 4.

Referring further to the end elevational view of FIG. 3; the top left isometric view of FIG. 4; and the top left perspective view of FIG. 5; it should be understood that the shape of mixer 50 gradually transitions along axis F from a generally circular opening at inlet 56 to a multifluted structure at outlet 58 to aide in the mixing. To provide contrasting views, FIGS. 3 and 4 illustrate centerbody 39 in relation to mixer 50, while FIG. 5 does not. Axis F is perpendicular to the view plane of FIG. 3 and is represented by cross hairs. At outlet 58, passage 54 terminates with a central aperture 60 surrounded by a number of lobes 62 (only a few of which are specifically designated to preserve clarity) as best seen in FIG. 3. Aperture 60 corresponds to a generally circular cross-section along axis F that is smaller in area than the circular cross-section along axis F at the circular opening of inlet 56.

Lobes 62 are radially disposed about axis F and gradually extend away from axis F with respect to a direction of travel along axis F from inlet 56 to outlet 58. This direction is designated as "downstream" and the opposite direction along axis F is designated "upstream" in correspondence with the direction gas is discharged from system 40 through discharge 36. Under this convention, a first position along axis F is downstream relative to a second position along axis F if the first position if farther along axis F in the downstream direction. Also, for this example, the second position is upstream relative to the first position because it is farther along axis F in the upstream direction.

Each lobe 62 is circumferentially positioned about passage 54,between a corresponding pair of adjacent lobes 62 to form a serpentine contour 63 about axis F. Individually, each one of lobes 62 is formed between two radii originating from axis F and intersecting points of mixer 50 that are relatively closest to axis F (minimum radius points) for the illustrated embodiment. In FIG. 3, a representative lobe 62 is designated between the radial end points R1 and R2 each corresponding to a radius originating from axis F.

As specifically designated for lobe 62 between points R1 and R2 in FIG. 3, lobes 62 each include a corresponding pair of confronting walls 64 radially extending from axis F. Each pair of confronting walls 64 are coupled by a curved dome 66 to collectively form a corresponding ridge 68 with radial apex 70. As lobes 62 flare away from axis F in the downstream direction, a number of troughs 72 are formed, each gradually deepening between a corresponding adjacent pair of lobes 62. Individually, each one of troughs 72 is formed between two radii originating from axis F and intersecting points of mixer 50 that are relatively farthest away form axis F (maximum radius points), which, for the illustrated embodiment, are coincident with the apices 70 of the adjacent pair of lobes 62. In FIG. 3, a representative trough 72 is designated between the radial points R3 and R4. The shading dots in FIG. 2 schematically represent receding regions corresponding to troughs 72.

Each lobe 62 includes an inner channel 74 formed between the corresponding pair of walls 64. Each inner channel 74 intersects the other inner channels 74 via passage 54 at a necked-down region 75 as illustrated for the lobe between points R1 and R2. As each lobe 62 flares away from axis F in the downstream direction, inner channels diverge away from one another and axis F. Correspondingly, lobes 62 each provide one of a number of divergent, inner chutes 76 that open into passage 54 to direct exhaust flow EF as it passes through mixer 50.

Each trough 72 includes an outer channel 84 formed between walls 64 of adjacent lobes 62. Each outer channel 84 is positioned between an adjacent pair of inner channels 74. Further, outer channels 84 are arranged to alternate with inner channels 74 about axis F. As each trough 72 advances in the downstream direction along axis F, outer channels 84 converge toward one another and axis F. Correspondingly, troughs 72 each provide one of a number of convergent outer chutes 86 to direct cooling fluid CF flowing between duct 42 and conduit 52 of mixer 50.

It should be understood that walls 64 are arranged to separate inner channels 74 from outer channels 84 and correspondingly provide alternating inner chutes 76 and outer chutes 86. Thus, with respect to a cross-section along axis F taken at outlet 58, walls 64 correspond to a number of annular sectors centered about axis F. Each lobe 62 and trough 72 belong to a different one of these sectors. In one preferred embodiment, these sectors each subtend an angle less than or equal to 90 degrees and lobes 62 number at least 2. In a more preferred embodiment, these sectors each subtend an angle less than or equal to 45 degrees and lobes 62 number at least 4. In a still more preferred embodiment, these sectors each subtend an angle of less than or equal to 30 degrees and lobes 62 number at least 6. In a most preferred embodiment, these sectors each subtend an angle of less than or equal to 15 degrees and lobes 62 number at least 12. In FIG. 3, representative sectors S1 and S2 are illustrated corresponding to one of lobes 62 and an adjacent trough 72, respectively. Sectors S1 and S2 are defined by radii rs1, rs2, rs3.

When traveling along axis F from inlet 56 to outlet 58, lobes 62 and troughs 72 gradually twist about axis F. Correspondingly, lobes 62 and troughs 72 each have a curving spiral or helical shape about axis F. Also, inner channels 74 and outer channels 84 are turned about axis F, following a corresponding spiral or helical path. It should be understood that in the illustrated embodiment, lobes 62, troughs 72, inner channels 74, outer channels 84, inner chutes 76, and outer chutes 86 each follow a corresponding spiral path that rotates about axis F for less than a complete revolution. The twisted shape of inner channels 74 increases the line-of-sight blockage of hot parts of engine 32 adjacent inlet 56 through outlet 58. The degree of twisting is preferably selected to provide a desired balance between the degree of blockage required and the cost/efficiency impact the twist may have, if any. For this illustrated embodiment, the shape of lobes 62 turn inner channels 74 about axis F to block view of inlet 56 through lobes 62 from a line of sight parallel to axis F that originates downstream of outlet 58.

Figure 5A:
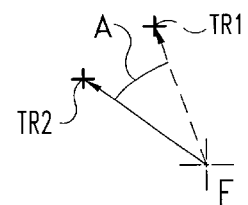
FIG. 5A is a schematic representation of the rotation about axis F of path P shown in FIG. 5.

The amount of rotation may be expressed in units of degrees that a radius rotates about axis F as it traces one of these paths along axis F in the downstream direction. One representative path P extending from point TR1 to point TR2 is illustrated along apex 70 of a corresponding lobe 62 in FIG. 5. In FIG. 5A, points TR1 and TR2 correspond to extreme positions of a radius tracing path P from inlet 56 to outlet 58. Point TR1 corresponds to an end of path P at inlet 56 and point TR2 corresponds to an end of path P at outlet 58. The angular separation between radii originating at axis F and terminating at points TR1 and TR2, respectively, is represented by angle A. Correspondingly, angle A also represents the amount of rotation of path P about axis F. In one preferred embodiment, angle A is at least 15 degrees. In a more preferred embodiment, angle A is at least 25 degrees. In a most preferred embodiment having twelve circumferentially spaced apart lobes 62 and troughs 72 in a generally symmetric arrangement about axis F, angle A is about 27 to about 30 degrees. In other embodiments, mixer 50 may be arranged to provide an amount of twist about axis F greater than 30 degrees for any of lobes 62, troughs 72, inner channels 74, inner chutes 76, outer channels 84, and/or outer chutes 86 up to and including one or more revolutions about axis F. Notably, mixer 50 may utilize a counter-twist to minimize any efficiency losses that might arise and still provide the desired blockage.

Figure 6:
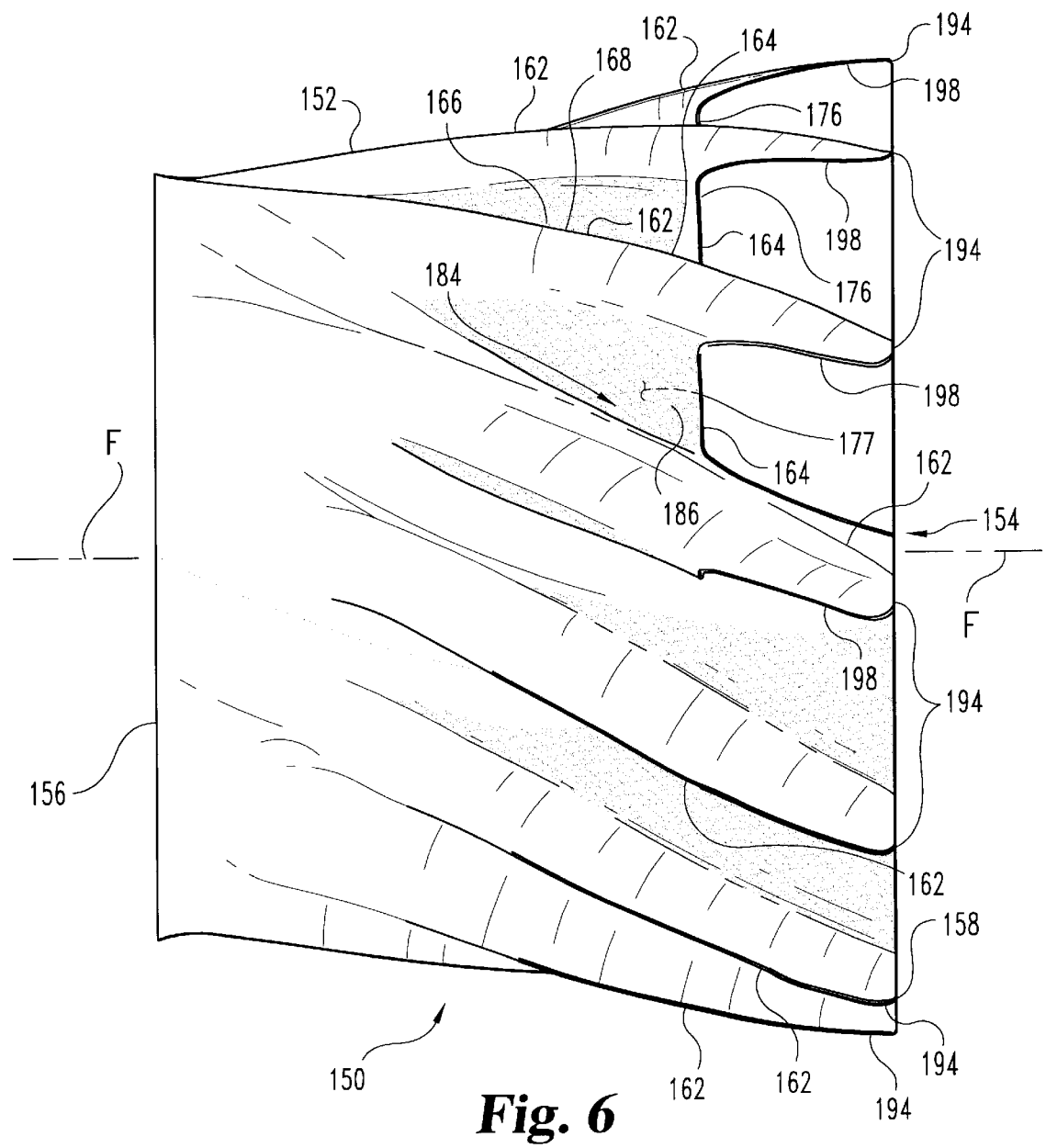
FIG. 6 is a side, elevational view of an exhaust mixer of a second embodiment of the present invention.
Figure 7:
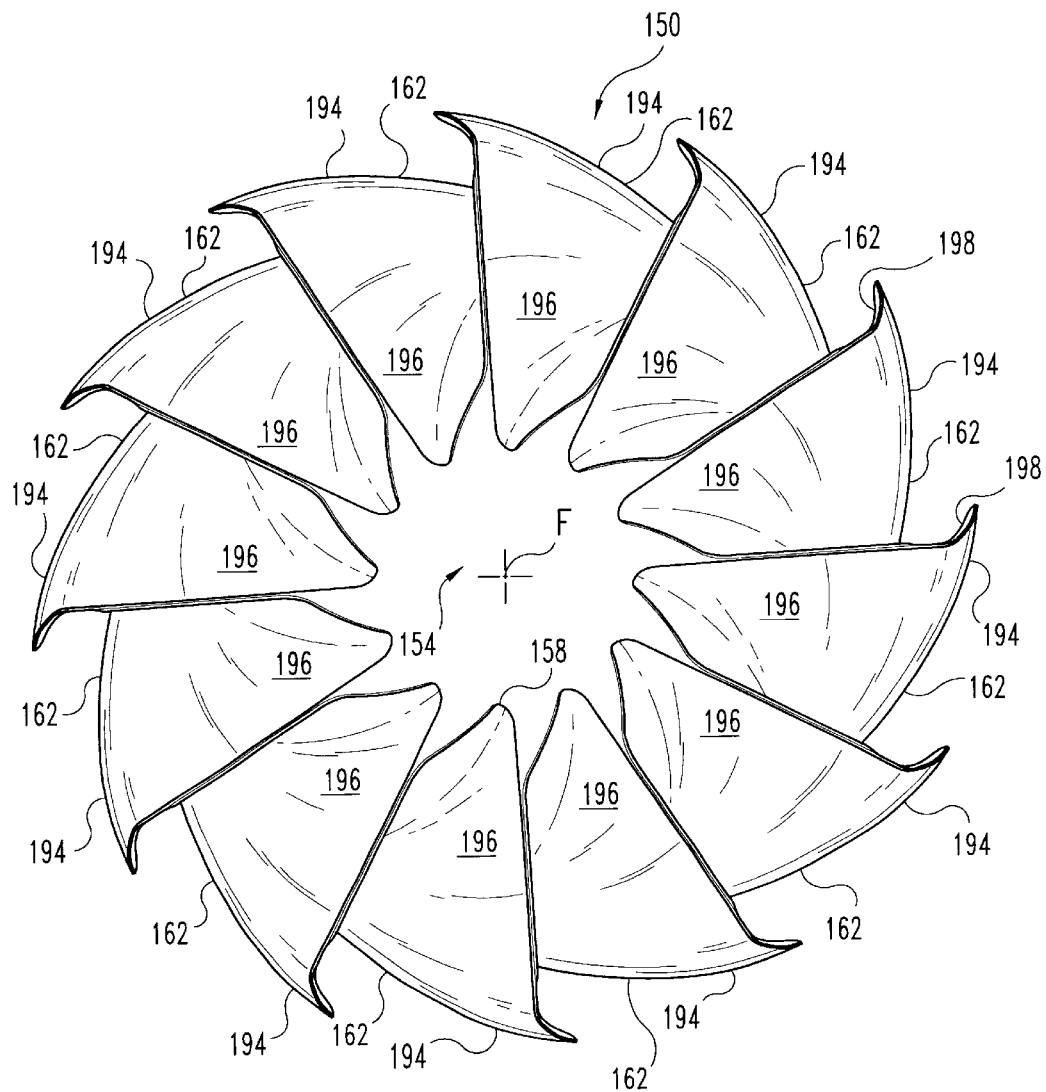
FIG. 7 is an end, elevational view of the embodiment of FIG. 6.
Figure 8:
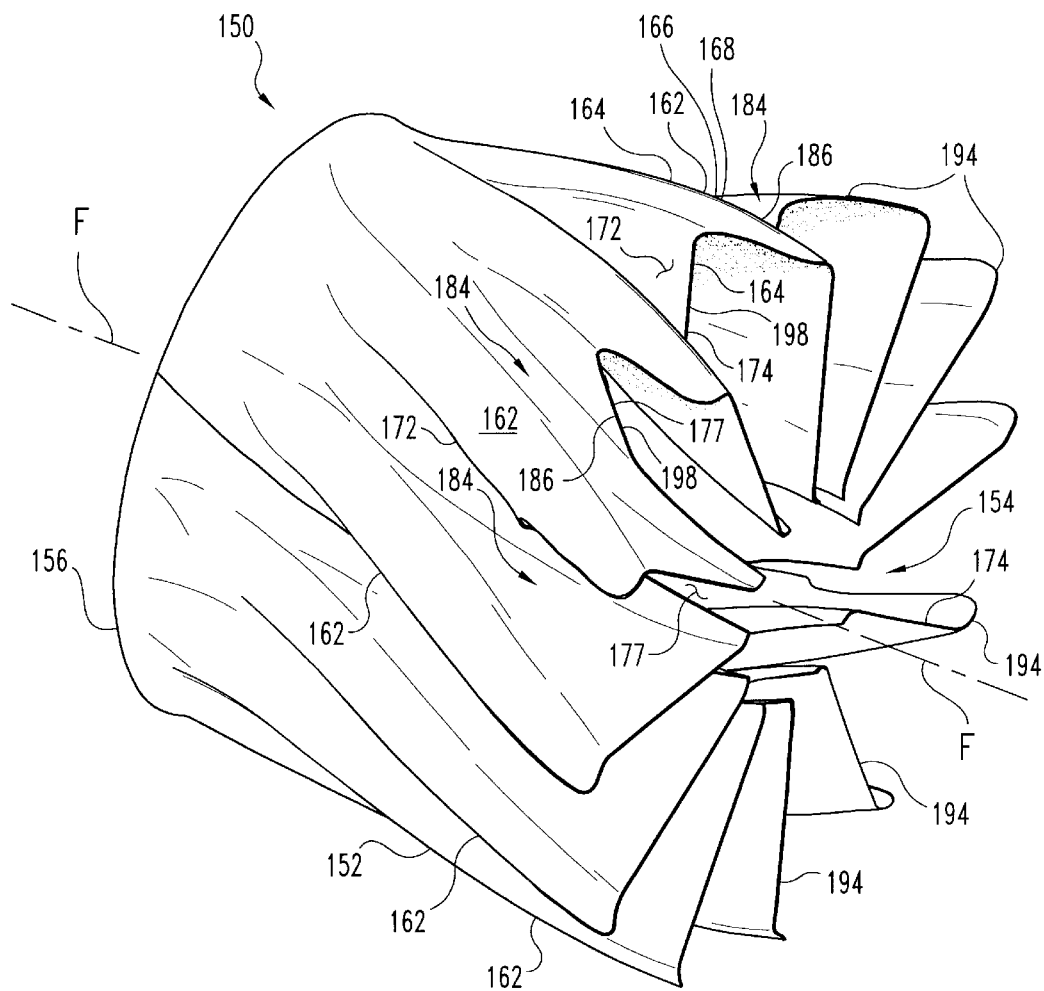
FIG. 8 is a top left, isometric view of the embodiment of FIG. 6.

Mixer 150 of another embodiment of the present invention is illustrated in the side, elevational view of FIG. 6; the end, elevational view of FIG. 7; and the top left, isometric view of FIG. 8. Mixer 150 includes duct 152 with passage 154 extending from inlet 156 to outlet 158 in a manner analogous to mixer 50. Furthermore, mixer 150 can be interchanged with mixer 50 in mixing system 40 of aircraft 20 described in connection with FIGS. 1–5. Mixer 150 includes lobes 162 each defined by a corresponding pair of side walls 164 radially extending from axis F and coupled together by a corresponding dome 166 to form a ridge 168, examples of which are shown in FIGS. 6 and 8. Lobes 162 are adjacently arranged to provide troughs 172, inner channels 174, inner chutes 176, outer channels 184, and outer chutes 186 that turn about axis F in a manner analogous to mixer 50. Furthermore, mixer 150 utilizes a mixing technique analogous to mixer 50. The shading dots in FIG. 6 schematically represent receding regions corresponding to troughs 172.

Each lobe 162 includes a wall portion 194 extending from a first one of its corresponding pair of walls 164 farther downstream along axis F than a second one of its corresponding pair of walls 164 at outlet 158. Only a few of wall portions 194 are specifically designated to preserve clarity. It should be understood that outer surface portion 196 of each wall portion 194 follows the twisting path about axis F to cover a corresponding inner chute 176 relative to a view plane downstream of outlet 158, such as the view plane of FIG. 7. Because inner chute surface 177 of each inner chute 176 is directly exposed to hot exhaust gas as it flows through passage 154 from inlet 156 to outlet 158, surface 177 typically presents a more intense thermal signature than outer surface portion 196 of each wall portion 194 relative to this downstream view plane. Correspondingly, for each pair of lobe walls 164, wall portion 194 extending from one of lobe walls 164 blocks the opposite lobe wall 164 from a view along a line of sight parallel to axis F from a position downstream of outlet 158.

In some arrangements, wall portions 194 may provide additional blockage of hot parts, such as turbine blades 35 and centerbody 39 for the same degree of twist relative to mixer 50. Furthermore, mixer 150 with wall portions 194 may be employed in situations where less twist is desired with comparable or greater thermal signature reduction. Referring back to FIG. 3, one alternative embodiment of mixer 150 may be provided through modification of mixer 50. For this adaptation, an outlet region 98 of lobes 62 that has a hot inner surface visible through outlet 158 is removed (only a few regions 98 are illustrated to preserve clarity). Referring again to FIGS. 6–8, the effect of this adaptation is to form a side wall slot 198 in each lobe, leaving wall portion 194 opposite the side wall slot 198.

Figure 9:
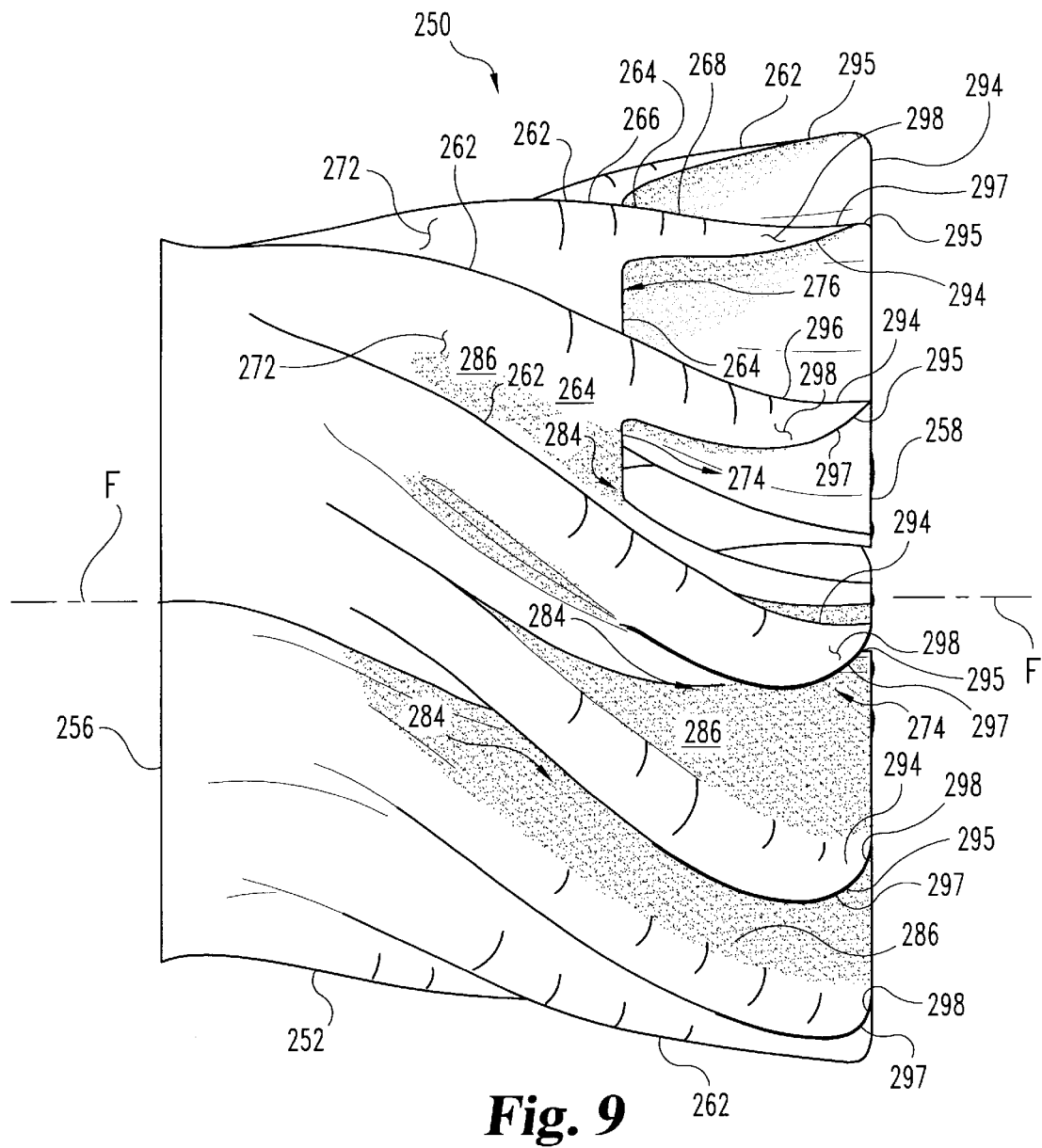
FIG. 9 is a side, elevational view of an exhaust mixer of a third embodiment of the present invention.
Figure 10:
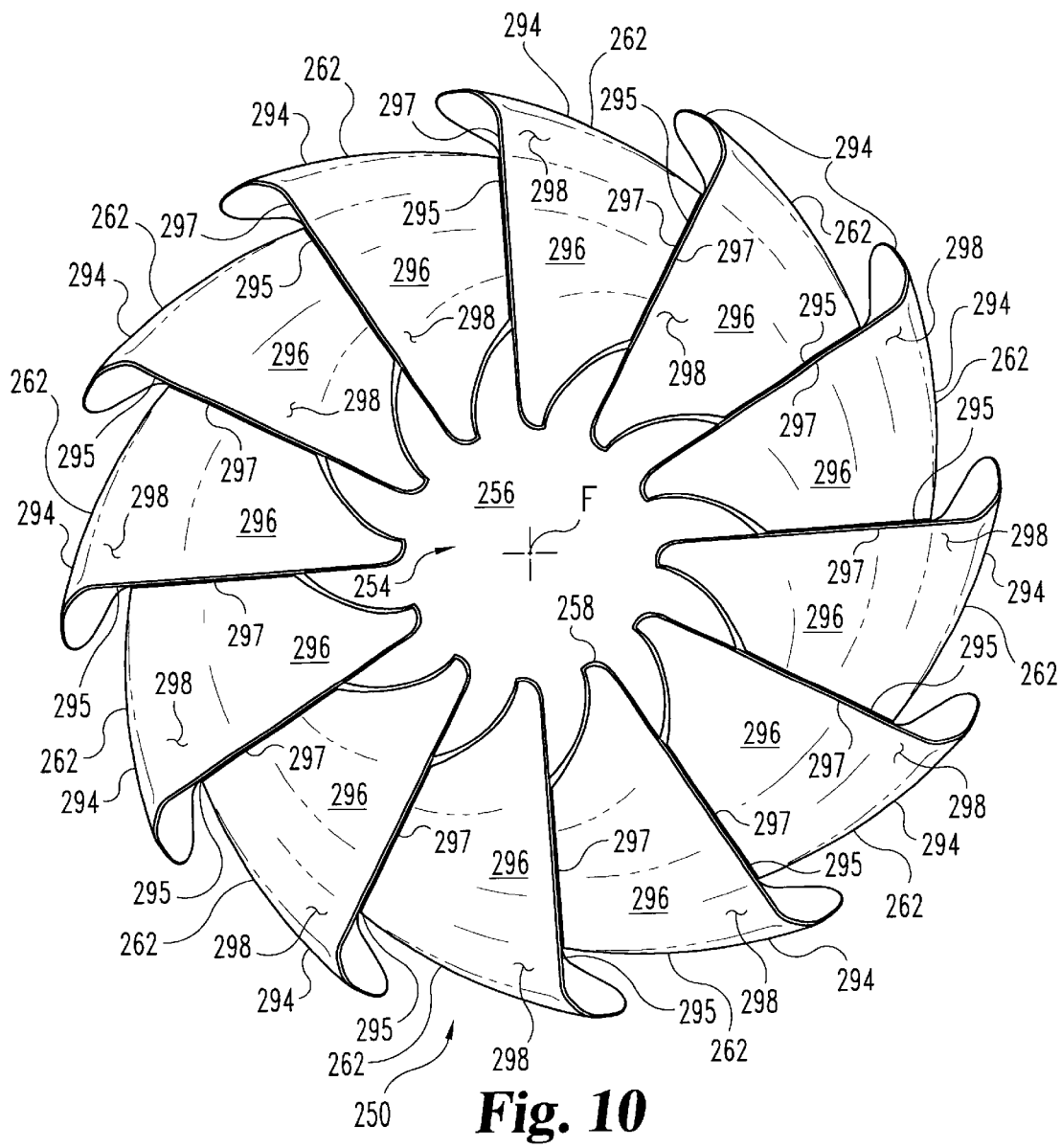
FIG. 10 is an end, elevational view of the embodiment of FIG. 9.
Figure 11:
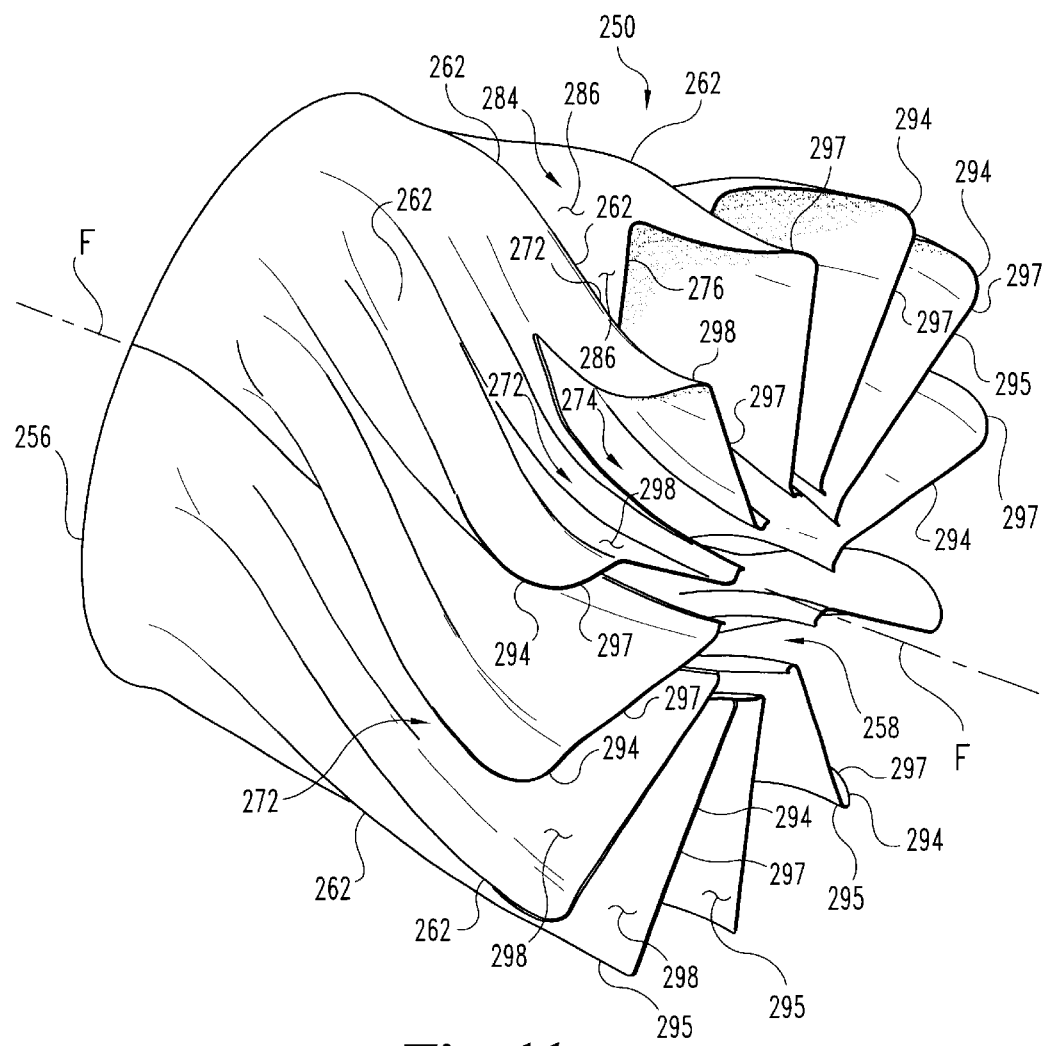
FIG. 11 is a top left, isometric view of the embodiment of FIG. 9.

Mixer 250 of another embodiment of the present invention is illustrated in the side, elevational view of FIG. 9; the end, elevational view of FIG. 10; and the top left, isometric view of FIG. 11. Mixer 250 includes duct 252 with passage 254 extending from inlet 256 to outlet 258 in a manner analogous to mixer 150. Furthermore, mixer 250 can be interchanged with mixer 50, 150 in mixing system 40 of aircraft 20 as described in connection with FIGS. 1–8. Mixer 250 includes lobes 262 each defined by a corresponding pair of side walls 264 radially extending from axis F and coupled together by a corresponding dome 266 to form a corresponding ridge 268, an example of which is specifically designated by reference numerals in FIG. 9. Lobes 262 are adjacently arranged to provide troughs 272, inner channels 274, inner chutes 276, outer channels 284, and outer chutes 286 that turn about axis F in a manner analogous to mixer 50, 150 (only a few of which are designated to preserve clarity). The shading dots in FIG. 9 schematically represent receding regions corresponding to troughs 272.

Each lobe 262 includes a wall portion 294 extending a first one of its corresponding pair of walls 264 farther downstream along axis F than a second one of its corresponding pair of walls at outlet 258. Only a few of wall portions 294 are specifically designated to preserve clarity. It should be understood that outer surface portion 296 of each wall portion 294 follows the twisting path about axis F to cover or hide a corresponding inner chute 276 relative to a view plane downstream of outlet 258, such as the view plane of FIG. 10 to reduce thermal signature as described in connection with mixer 150.

As in the case of wall portions 194 of mixer 150, wall portions 294 of mixer 240 provide additional blockage of hot parts for the same degree of twist relative to mixer 50. Furthermore, mixer 250 with wall portions 294 may be employed in situations where more blockage is desired with less twist relative to mixer 50. Moreover, wall portions 294 terminate in a curved end portion 295 configured to turn working fluid as it exits outlet 258. Only a few of portions 295 are specifically designated to preserve clarity. The curvature of portions 295 is preferably configured to turn at least a portion of the working fluid back towards axis F, providing for the recovery of at least some of the loss that might arise due to swirl caused by the mixing action. Correspondingly, wall portions 294 each provide a region 297 that curves in a direction opposite the direction of the twist about axis F to provide a coanda surface 298.

Figure 12:
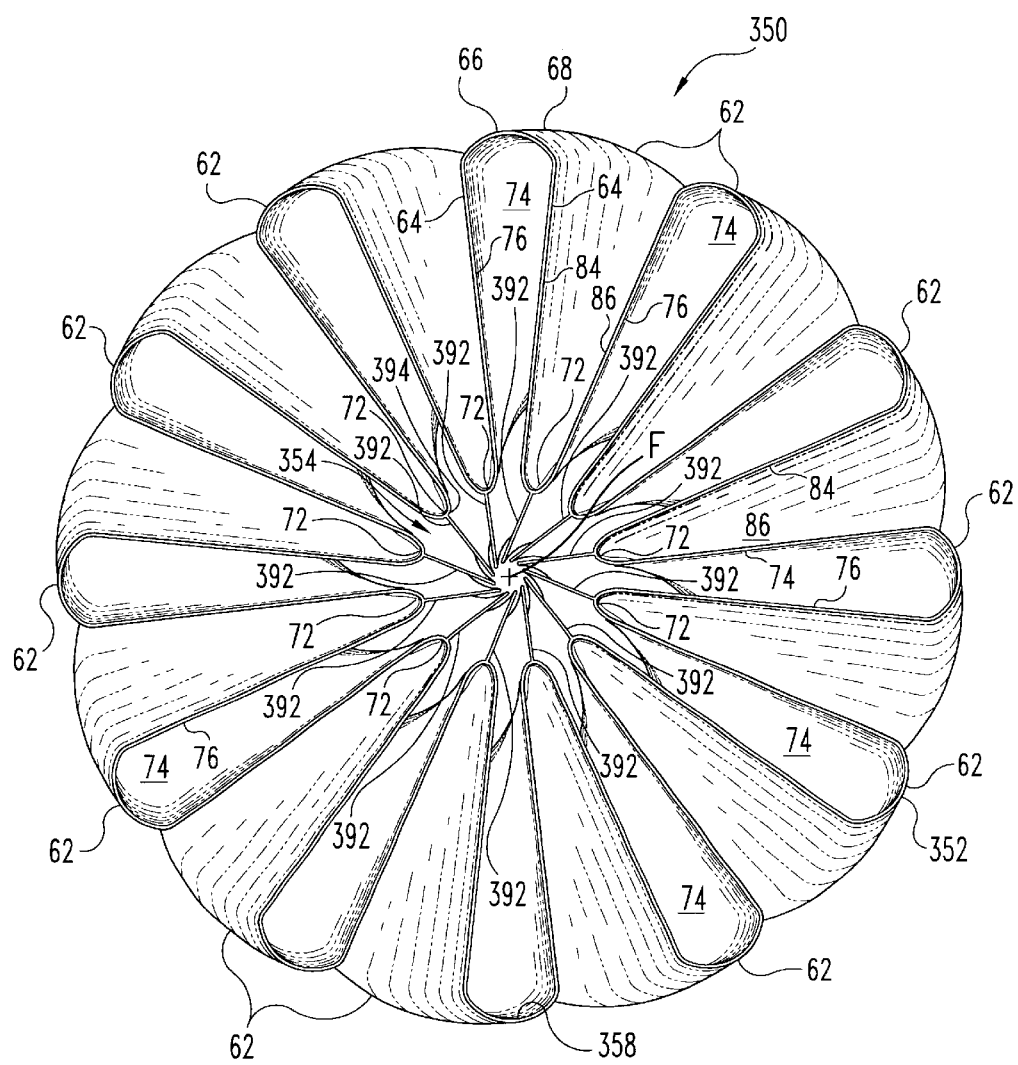
FIG. 12 is an end, elevational view of an exhaust mixer of a fourth embodiment of the present invention.
Figure 13:
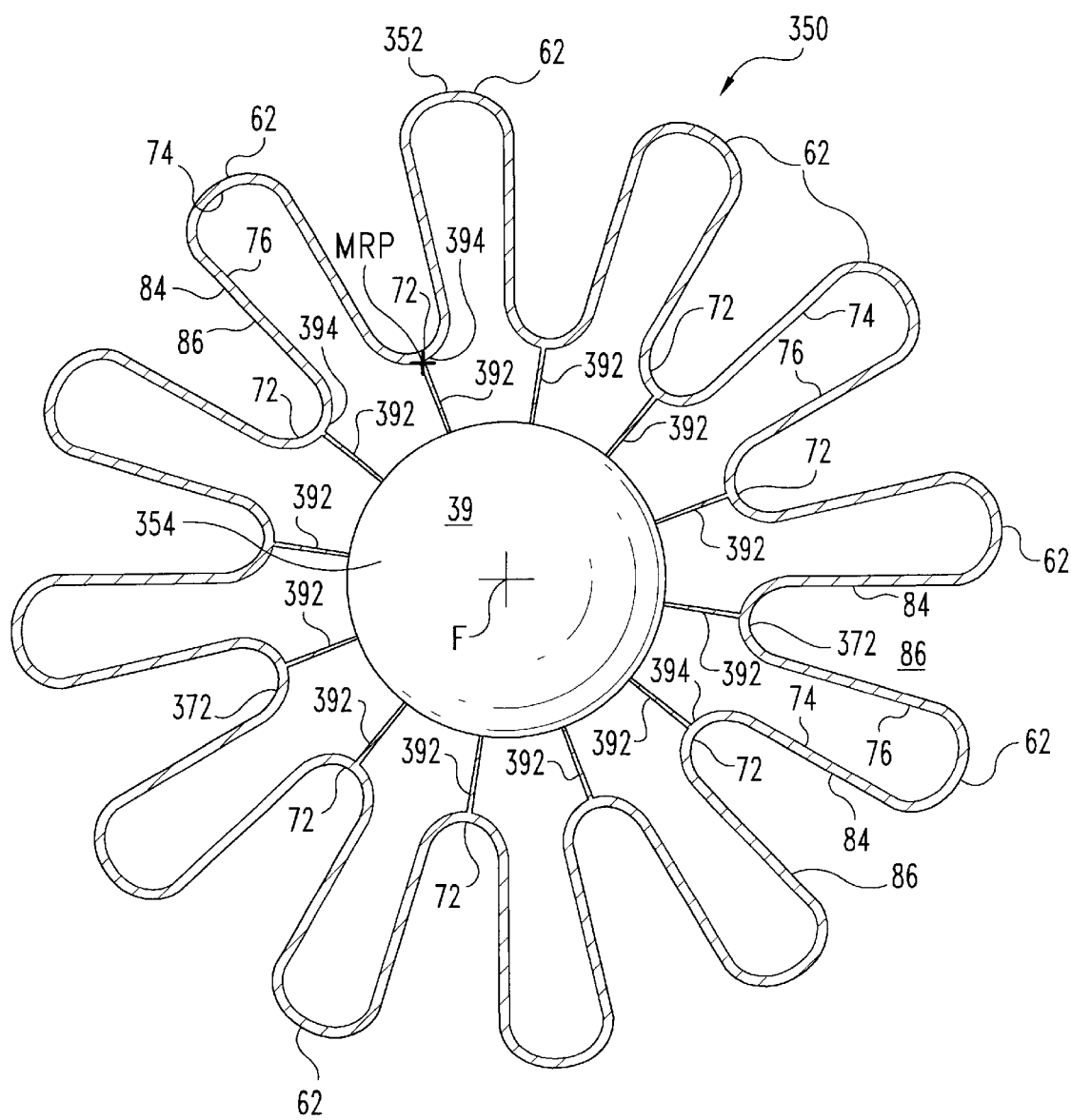
FIG. 13 is a partial sectional, end view of the embodiment of FIG. 12.
Figure 14:
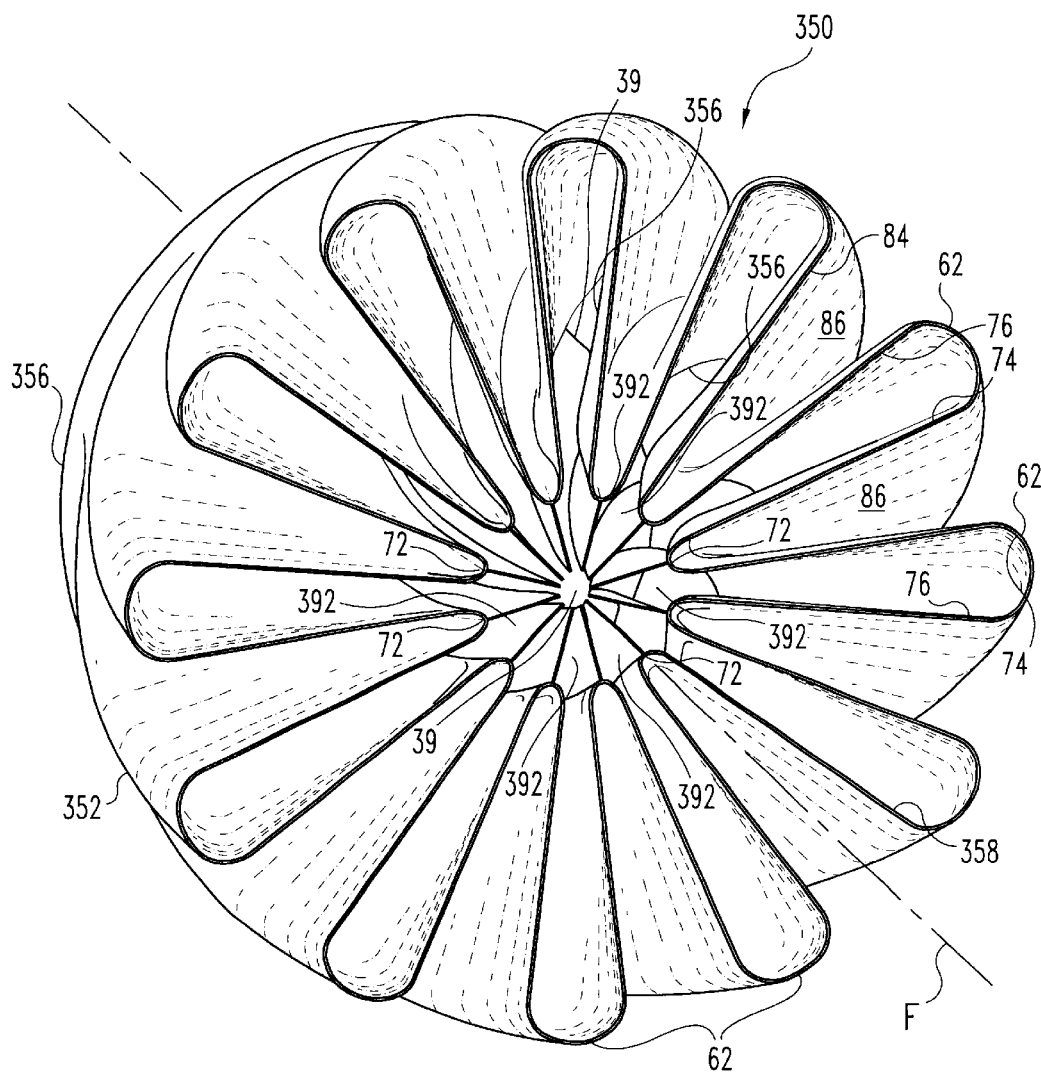
FIG. 14 is a top left, isometric view of the embodiment of FIG. 12.

Mixer 350 of another embodiment of the present invention is illustrated in the end, elevational view of FIG. 12; the schematic partial sectional, end view of FIG. 13 with centerbody 39; and the top left, isometric view of FIG. 14 with centerbody 39. Mixer 350 includes duct 352 with passage 354 extending from inlet 356 to outlet 358 in a manner analogous to mixers 50, 150, 250. Furthermore, mixer 350 can be interchanged with mixer 50, 150, 250 in mixing system 40 of aircraft 20 as described in connection with FIGS. 1–11. Mixer 350 includes the twisted lobe/trough structure of mixer 50 with like reference numerals representing like features. Specifically, mixer 350 includes lobes 62 each defined by a corresponding pair of walls 64 radially extending from axis F and coupled together by a corresponding dome 66 to form a ridge 68, an example of which is specifically designated by reference numerals in FIG. 12. Lobes 62 are adjacently arranged to provide troughs 72, inner channels 74, inner chutes 76, outer channels 84, and outer chutes 86 that turn about axis F in a manner analogous to mixer 50 (only a few of which are shown to preserve clarity).

Mixer 350 includes a number of blocking fins 392 that each extend into passage 354 along toward axis F along a different radius. Only a few of fins 392 may be specifically designated to preserve clarity. From the view plane of FIG. 12, fins 392 form a spiral pattern about axis F (represented by cross hairs). Fins 392 each emanate from an inner surface 394 of conduit 352 at a minimum radius point bounding outlet 358, an example of which is designated as point MRP in the sectional view of FIG. 13. The schematic sectional view of FIG. 13 presents a sectional contour of mixer 350 along a plane perpendicular to and intersecting axis F between inlet 356 and outlet 358 of mixer 350. Axis F is perpendicular to the view plane of FIG. 13 and is represented by cross hairs.

The minimum radius point MRP generally coincides with the location where two adjacent lobes 62 meet at the bottom of a trough 72. Accordingly, fins 392 each follow a spiral path of a different trough 72, and each correspond to one of lobes 62, inner channels 74, inner chutes 76, outer channels 84 and outer chutes 86. From the view plane of FIG. 12, the twisted path followed by each fin 392 provides further blockage of hot parts in addition to the obstruction caused by twisting inner channels 74 and corresponding inner chutes 76. It should be understood that in other embodiments, more or fewer fins 392 may be utilized for the same number of lobes 62 and/or troughs 72, or may be absent altogether.

Figure 15:
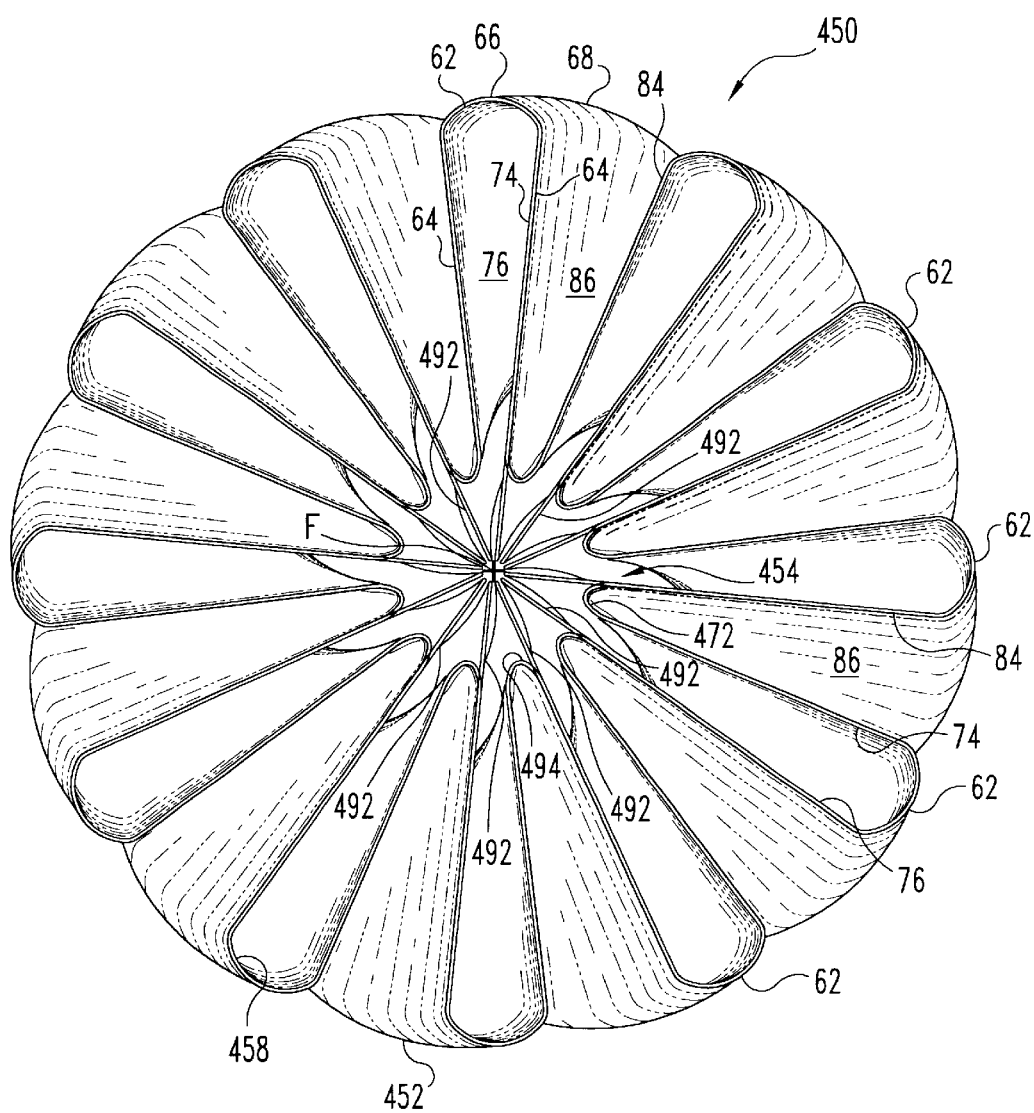
FIG. 15 is an end, elevational view of an exhaust mixer of a fifth embodiment of the present invention.
Figure 16:
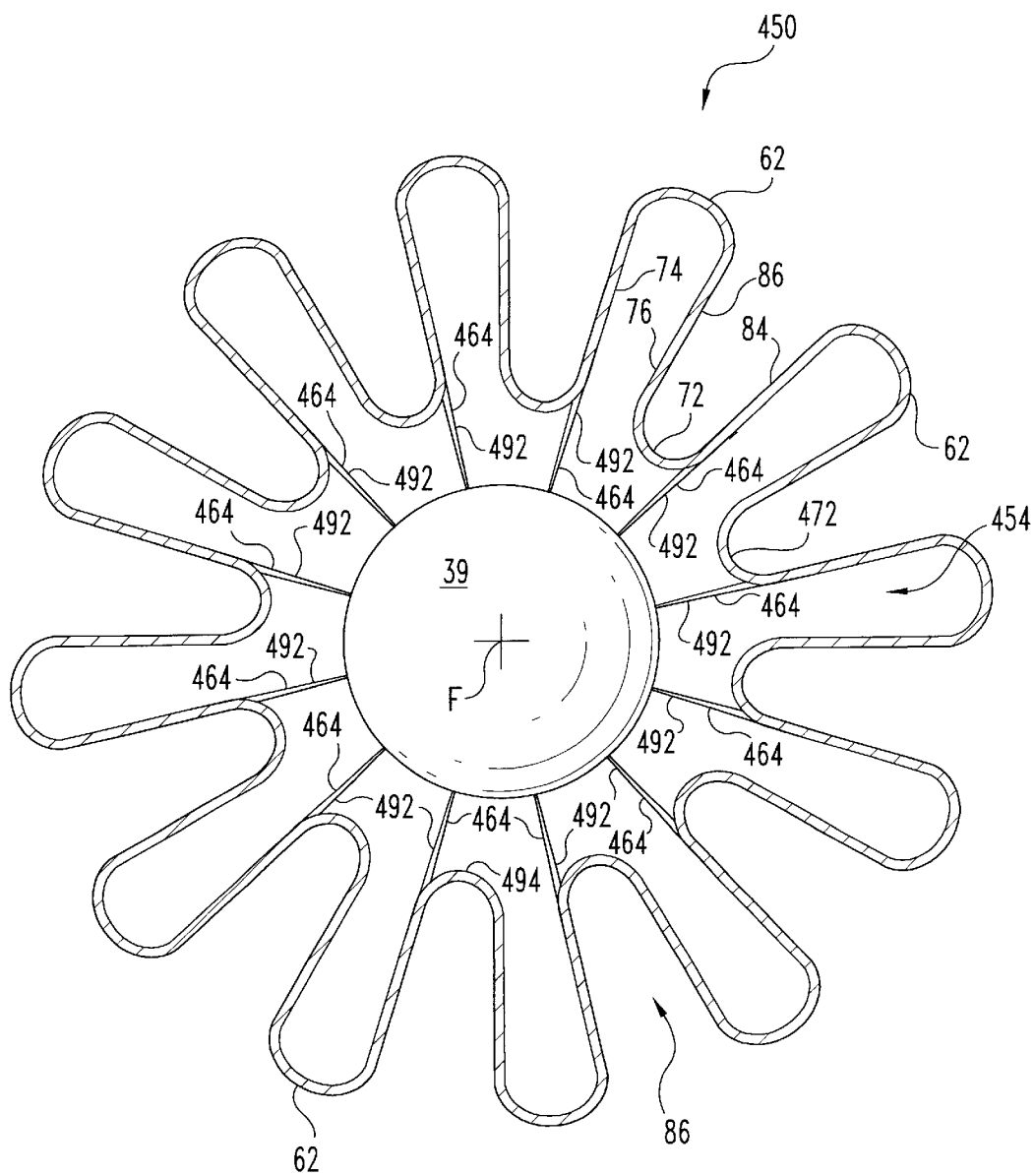
FIG. 16 is a partial sectional, end view of the embodiment of FIG. 15.
Figure 17:
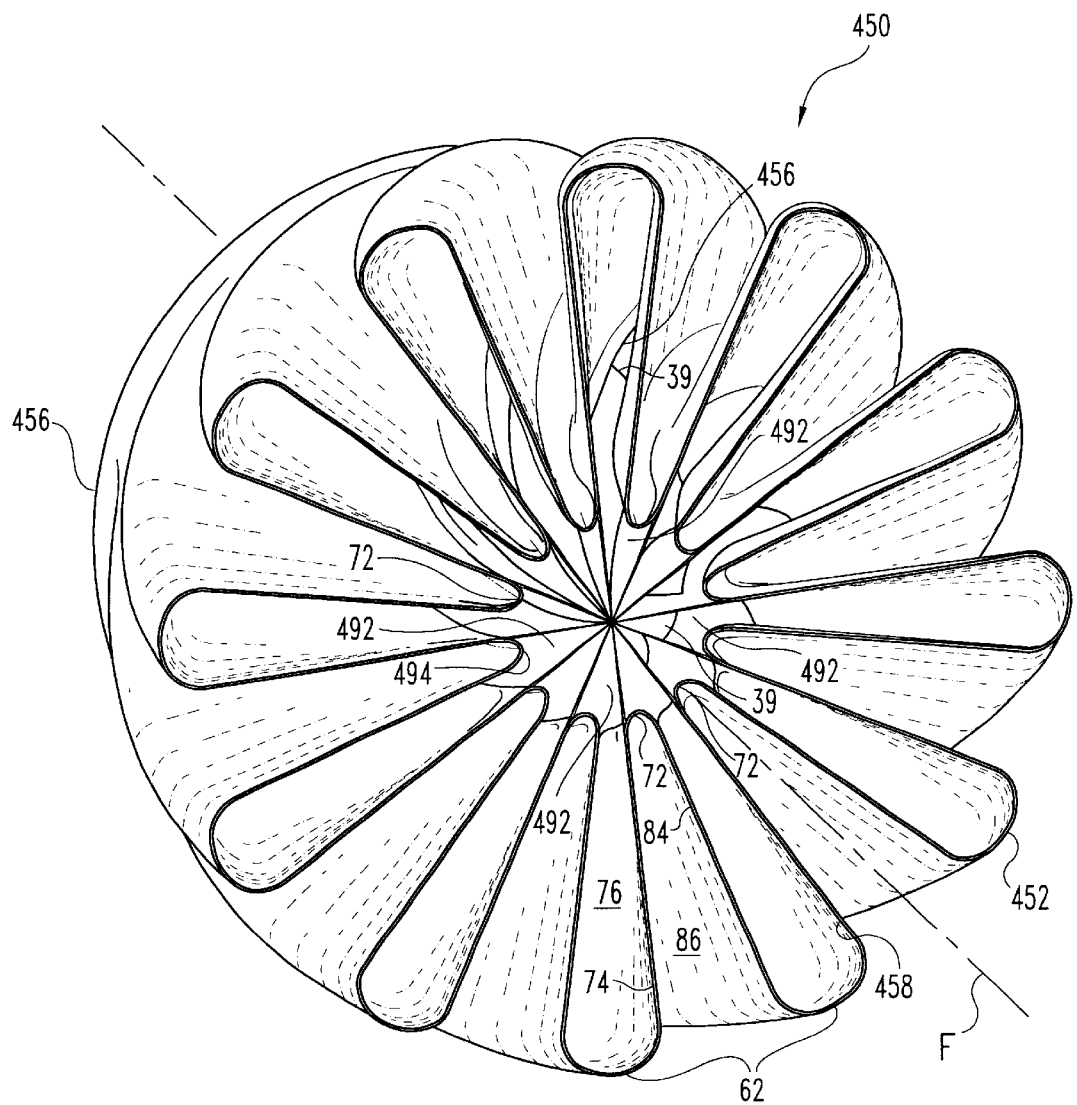
FIG. 17 is a top left, isometric view of the embodiment of FIG. 15.

Mixer 450 of another embodiment of the present invention is illustrated in the end, elevational view of FIG. 15; the schematic partial sectional, end view of FIG. 16 with centerbody 39; and the top left, isometric view of FIG. 17 with centerbody 39. Mixer 450 includes duct 452 with passage 454 extending from inlet 456 to outlet 458 in a manner analogous to mixers 50, 150, 250, 350. Furthermore, mixer 450 can be interchanged with mixer 50, 150, 250, 350 in mixing system 40 of aircraft 20 as described in connection with FIGS. 1–14. Mixer 450 includes the twisted lobe/trough structure of mixer 50 with like reference numerals representing like features. Specifically, mixer 450 includes lobes 62 each defined by a corresponding pair of walls 64 radially extending from axis F and coupled together by a corresponding dome 66 to form a ridge 68, an example of which is specifically designated by reference numerals in FIG. 15. Lobes 62 are adjacently arranged to provide troughs 72, inner channels 74, inner chutes 76, outer channels 84, and outer chutes 86 that turn about axis F in a manner analogous to mixer 50 (only a few of which are designated to preserve clarity).

As in the case of mixer 350, mixer 450 includes a number of blocking fins 492 that each extend into passage 454 toward axis F. Only a few of fins 492 may be specifically designated to preserve clarity. From the view plane of FIG. 12, fins 492 form a spiral pattern about axis F (represented by cross hairs). Fins 492 each emanate from an inner surface 494 of conduit 452, and generally extending one of each pair of walls 64 comprising a lobe 62. Collectively, the wall 64 and the extending fin 492 are designated extended wall portion 464 as depicted in FIG. 16. It should be understood that the extension of each fin 492 into passage 454 is offset from the minimum radius point from which fins 392 emanate. This offset is best seen by comparing the sectional view of FIG. 13 for mixer 350 to the schematic sectional view of FIG. 16 for mixer 450, where the cross section of FIG. 16 corresponds to a sectional contour of mixer 450 along a plane perpendicular to and intersecting axis F at a position between inlet 456 and outlet 458. Fins 492 provide additional blockage of hot parts relative to mixer 350 and follow a twisting path corresponding to the twist of lobes 62, troughs 72, inner channels 74, inner chutes 76, outer channels 84, and outer chutes 86. In alternative embodiments, the position of fins 492 relative to each other and corresponding lobes 62 and/or troughs 72 may be varied, may be intermixed with fins 392, may vary in number relative to the number of lobes 62 and/or troughs 72, or may be absent.

Figure 18:
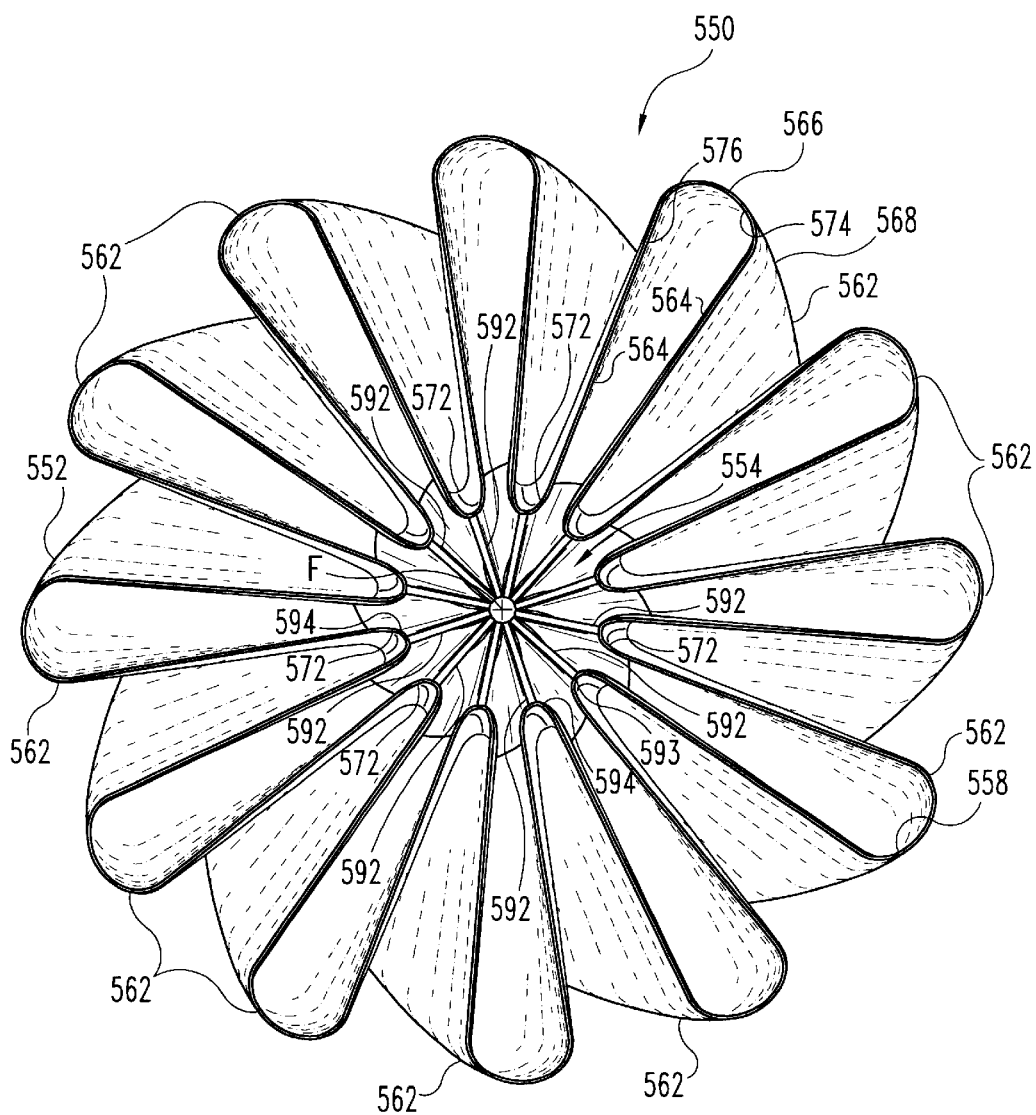
FIG. 18 is an end, elevational view of an exhaust mixer of a sixth embodiment of the present invention.
Figure 19:
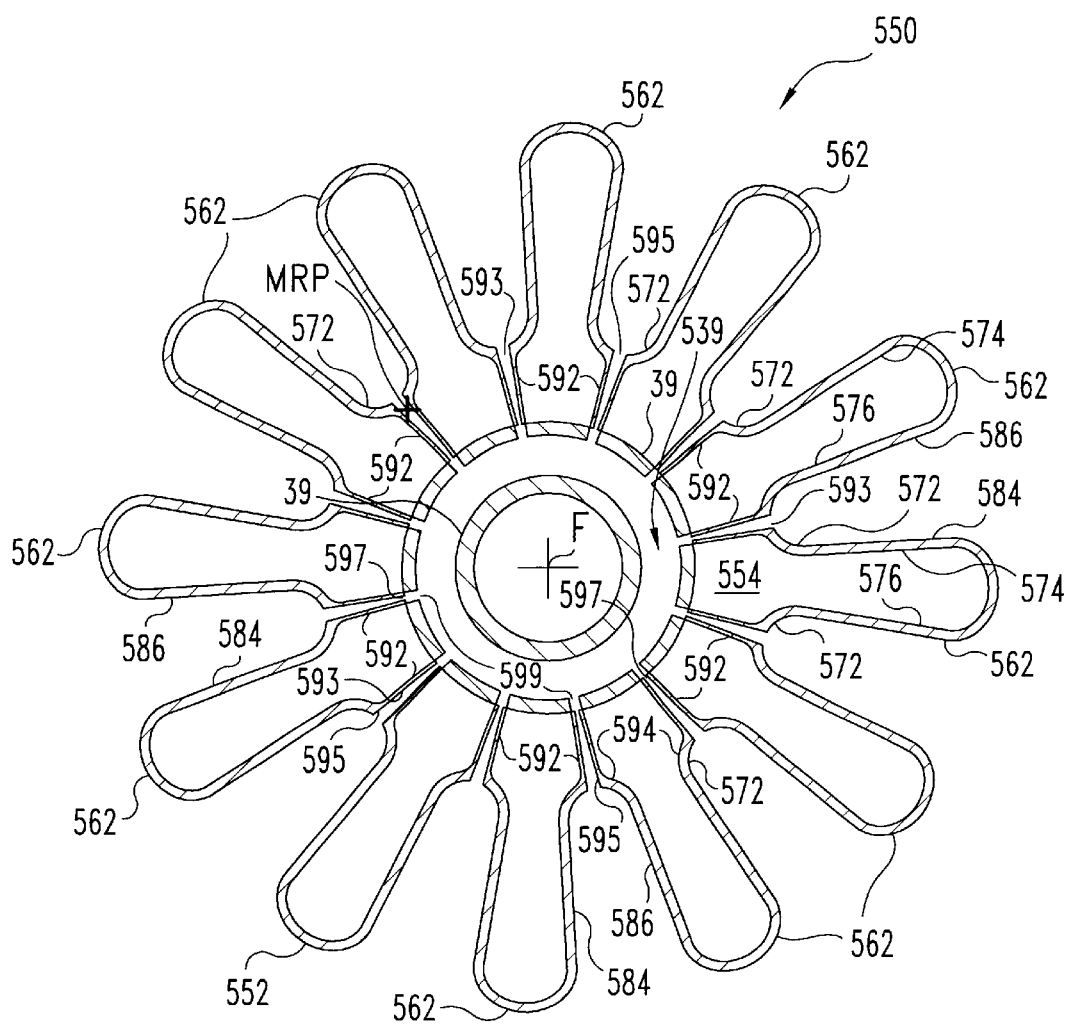
FIG. 19 is a partial sectional, end view of the embodiment of FIG. 18.
Figure 20:
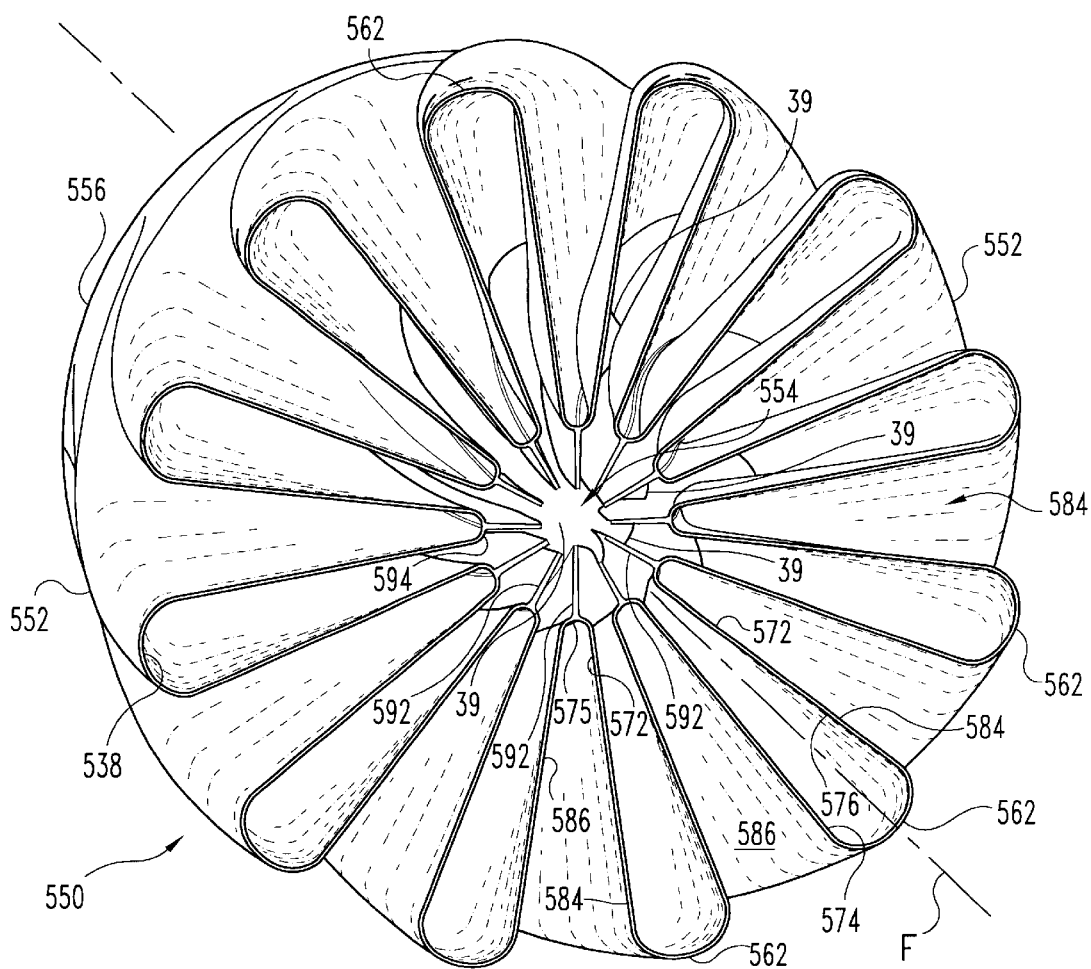
FIG. 20 is a top left, isometric view of the embodiment of FIG. 18.

Mixer 550 of another embodiment of the present invention is illustrated in the end, elevational view of FIG. 18; the schematic partial sectional, end view of FIG. 19 with centerbody 39; and the top left, isometric view of FIG. 20 with centerbody 39. Mixer 550 includes duct 552 with passage 554 extending from inlet 556 to outlet 558 in a manner analogous to mixer 50, 150, 250, 350, 450. Furthermore, mixer 550 can be interchanged with mixer 50, 150, 250, 350, 450 in mixing system 40 of aircraft 20 described in connection with FIGS. 1–17. Mixer 550 includes lobes 562 each defined by a corresponding pair of side walls 564 radially extending from axis F and coupled together by a corresponding dome 566 to form a ridge 568, an example of which is specifically designated by reference numerals in FIG. 18. Lobes 562 are adjacently arranged to provide troughs 572, inner channels 574, inner chutes 576, outer channels 584, and outer chutes 586 that turn about axis F in a manner analogous to mixer 50, 150, 250, 350, 450.

Mixer 550 includes a number of hollow cooling fins in the form of vanes 592 that each extend into passage 554 toward axis F along a different radius. Only a few of vanes 592 may be specifically designated to preserve clarity. From the view plane of FIG. 18, vanes 592 form a spiral pattern about axis F (represented by cross hairs). Vanes 592 each emanate from an inner surface 594 of conduit 552 at a minimum radius point bounding outlet 558, an example of which is designated as point MRP in the schematic sectional contour of mixer 550 shown in FIG. 19. The schematic sectional contour of FIG. 19 is taken along a plane perpendicular to and intersecting axis F between inlet 556 and outlet 558 of mixer 550. Axis F is perpendicular to the view plane of FIG. 19 and is represented by cross hairs.

The minimum radius point MRP generally coincides with the location where two adjacent lobes 562 meet at the bottom of a trough 572. Accordingly, vanes 592 each follow a spiral path of a different trough 572, and each correspond to one of lobes 562, inner channels 574, inner chutes 576, outer channels 584 and outer chutes 586. From the view plane of FIG. 18, the twisted path followed by each vane 392 provides further blockage of hot parts in addition to the obstruction caused by twisting inner channels 574 and corresponding inner chutes 576.

Each one of vanes 592 defines a passageway 593 therethrough. Each passageway 593 has an opening 595 intersecting a corresponding outer channel 584 and an opening 597 intersecting plenum 539 within centerbody 39 via plenum opening 599 as best illustrated in FIG. 19. Accordingly, passageways 593 provide fluid communication between each corresponding outer channel 584 and plenum 539. Vanes 592 and corresponding passageways 593 are preferably configured to supply cooling fluid, such as air from outer channels 584 to cool centerbody 39 of engine 32 to suppress its thermal signature. In one embodiment, opening 595 of each passageway 593 is configured to capture the total (stagnation) pressure of the outer cooling fluid flowing though the outer channel 584 it intersects. Typically this arrangement creates a cooling air driving potential for air originating from each outer channel 584 to pass into a respective one of passageways 593 through its opening 595, and enter plenum 539 through corresponding openings 597 and 599. Centerbody 39 may also include one or more slits, slots, or other openings to vent cooling fluid from plenum 539 as appropriate (not shown). Notably in another embodiment, fewer than all of vanes 592 include passageway 593. In still other embodiments, vanes 592 may be variously positioned relative to each other and lobes 562 analogous to fins 392, 492, or may be absent altogether. In still other embodiments centerbody 39 may lack a plenum 539 and/or openings 599 or may be absent.

The components of aircraft 20, mixing system 40 and mixers 50, 150, 250, 350, 450, 550 are preferably made from standard materials selected to perform as intended in the environment expected. For example, mixers 50, 150, 250, 350, 450, 550 may be made of a metallic material, a ceramic material, a composite material, or a combination of these selected to withstand expected exhaust temperatures. Furthermore, coatings may be applied to mixing system components according to the present invention to further suppress thermal signal and/or reduce radar cross section.

Many further embodiments of the present invention are envisioned. For instance, in other embodiments, the features of any of mixers 50, 150, 250, 350, 450, or 550 may be combined, deleted, altered, duplicated or otherwise rearranged as would occur to those skilled in the art without departing from the spirit of the present invention. In other examples, the curved or twisting pattern in one or more of mixers 50, 150, 250, 350, 450, 550, may have a different shape, such as a counter-twist, to offset any losses that might occur for a particular configuration. In still other embodiments, the twisted or curved lobes and/or troughs are absent, instead following a generally straight path with respect to axis F. Moreover, the size and shape of lobes, troughs, channels, chutes, wall portions, and fins may vary, may be nonuniformly distributed about axis F, and/or may not follow a uniform pattern of curvature or twist with respect to a reference axis. For example, only a portion of such features may be curved, two or more degrees of curvature or twist may be employed, different features may have different degrees of twist or curvature, and/or one or more of these features may be S-shaped. In another example, lobes of the present invention may not have a rounded, curvilinear shape, but rather have an angular or rectilinear shape. Further, a mixer according to the present invention may utilize lobes or troughs that twist or curve relative to a reference axis other than the centerline axis of the mixer. In other embodiments, fins and/or vanes may or may not be twisted or may follow a different twist or curvature pattern than lobes or troughs. In yet other embodiments, one or more other structures like fins 343, 443 and/or vanes 543 may be utilized to the exclusion of twisted lobes and/or troughs to provide the requisite blockage. Also, wall portions, blocking fins and vanes of mixers 150, 250, 350, 450, 550 may be intermixed and/or positions of the structures varied with respect to the lobe/trough structure in a given mixer application. For instance, fins of both the side wall extending type and those emanating between side walls from a minimum radius point or otherwise can be utilized in the same mixer. In yet other embodiments of the present invention, variations and modifications as would otherwise occur to one skilled in the art are envisioned.

In a further embodiment of the present invention, an exhaust mixer includes a passage extending from an inlet to an outlet to convey an exhaust flow therethrough. Several lobes are also included that are circumferentially disposed about the axis and that each define a corresponding one of several inner channels. These inner channels intersect one another between the inlet and the outlet. The lobes are each shaped to turn the inner channels about the axis to block viewing of the inlet through the lobes from a view plane perpendicular to the axis and downstream of the outlet.

Still another embodiment includes a gas turbine engine and an exhaust mixer coupled to the engine along an outlet. This mixer includes several outward ridges radially projecting away from the axis that each define one of a number of inner channels intersecting at least one other of the inner channels within the mixer. These ridges are each shaped to turn the channels about the axis.

In yet another embodiment, a gas turbine engine is included that is operable to produce an exhaust flow. Also included is a conduit coupled to the engine along an axis to mix the exhaust flow with cooling air. This conduit includes a number of lobes each defining a corresponding one of several inner channels circumferentially disposed about the passage. These lobes are each shaped to turn a corresponding one of the channels about the axis as they advance therealong. Also, a number of fins are included that each extend into the passage along the conduit and each converge with one or more other of the fins as the axis is approached.

In a further alternative, an apparatus includes a gas turbine engine operable to produce an exhaust flow and a mixer coupled to the engine along an axis to mix the exhaust flow with cooling air. This mixer includes a passage positioned along the axis to convey the exhaust flow therethrough, several inner chutes circumferentially disposed about the passage, several outer chutes circumferentially disposed about the passage, and a number of vanes extending into the passage. The outer chutes are each positioned between a respective pair of inner chutes and the vanes each include a passageway in fluid communication with the corresponding one of the outer chutes.

In a further alternative embodiment, an apparatus includes a gas turbine engine and a mixer coupled to the engine along an axis to mix cooling air with an exhaust flow produced during engine operation. This mixer includes an inlet and an outlet opposite the inlet along the axis and a number of lobes radially disposed about the axis. These lobes each turn about the axis between the inlet and outlet. The lobes include a number of wall portions at the outlet that each extend a first side of a respective one of the lobes past a second side of a respective one of the lobes along the axis to reduce thermal signature of the apparatus.

In yet a further embodiment, a mixer is coupled to a gas turbine engine along an axis to mix cooling air with an exhaust flow produced during engine operation. This mixer includes an inlet and an outlet opposite the inlet along the axis, a number of inner chutes, and a number of wall portions at the outlet. The inner chutes are radially disposed about the axis and each turn about the axis as the inner chutes each extend therealong. The wall portions each extend from a corresponding one of the inner chutes to block the view of the corresponding one of the inner chutes from downstream of the outlet along a line of site parallel to the axis.

In a still further embodiment, an apparatus includes a gas turbine engine and a mixer coupled to the engine along an axis to mix cooling air with an exhaust flow produced during engine operation. This mixer includes an inlet and an outlet opposite the inlet along the axis and a number of lobes radially disposed about the axis. The lobes each turn about the axis between the inlet and the outlet as the lobes each extend along this axis. The lobes each include a respective one of a number of first walls opposite a respective one of a number of second walls. The respective one of the first walls hides the respective one of the second walls from view along a line of site parallel to the axis that originates downstream of the outlet.

All publications, patents, and patent applications cited herein are hereby incorporated by reference as if each individual publication, patent or patent application were specifically and individually indicated to be incorporated by reference and set forth in its entirety herein including, but not limited to U.S. Pat. No. 4,576,002 to Mavrocostas; U.S. Pat. No. 4,566,270 to Ballard et al.; U.S. Pat. No. 4,548,034 to Maguire; U.S. Pat. No. 4,543,784 to Kirker; and U.S. Pat. No. 4,487,017 to Rodgers and U. S. Provisional Application No. 60/114,623 filed Jan. 4, 1999. While the invention has been illustrated and described in detail in the drawings and foregoing description, the same is to be considered as illustrative and not restrictive in character, it being understood that only the preferred embodiment has been shown and described and that all changes, modifications, and equivalents that come within the spirit of the invention as defined by the following claims are desired to be protected.

What is claimed is:

1. An exhaust mixer, comprising:
    a passage extending from an inlet to an outlet to convey an exhaust flow therethrough, said passage extending along a centerline axis of the mixer;
    several lobes circumferentially disposed about the axis and each defining a corresponding one of several inner channels, said inner channels each intersecting at least one other of said inner channels between said inlet and said outlet;
    several fins each projecting into said passage from an inner surface bounding said inner channels or said passage; and
    wherein said lobes are each shaped to turn said inner channels about said axis to block viewing of said inlet through said lobes from a view plane perpendicular to said axis and downstream of said outlet, and at least one of said fins is in the form of a vane defining a passageway in fluid communication with a corresponding one of said outer channels.

2. The exhaust mixer of claim 1, wherein said inlet has a generally circular cross section along said axis and said outlet has a generally symmetric, serpentine contour about said axis.

3. The exhaust mixer of claim 1, wherein said mixer further includes several outer channels each positioned between a corresponding pair of said inner channels, said lobes each include a different pair of a number of walls radially disposed about said axis, and said walls each separate a respective one of said inner channels from a respective one of said outer channels.

4. The exhaust mixer of claim 3, wherein said inner channels and said outer channels each correspond to a different one of a number of sectors of a cross section taken along said axis, said sectors each subtending an angle less than or equal to 45 degrees.

5. The exhaust mixer of claim 1, wherein said lobes each have a helical shape about said axis to rotate each of said inner channels at least 15 degrees about said axis, and said lobes each flare away from said axis as said lobes each advance in a direction from said inlet to toward said outlet along said axis.

6. An apparatus, comprising: an engine operable to discharge an exhaust flow and a mixer coupled to said engine along a centerline axis to mix the exhaust flow with cooling air, said mixer including:

a passage extending from an inlet to an outlet along said centerline axis;

a number of lobes each defining a different one of a number of inner chutes, said inner chutes each opening into said passage and being shaped to block any line-of-sight view of said engine therethrough by twisting about said centerline axis; and several fins each projecting into said passage from an inner surface bounding said inner chutes or said passage, wherein one or more of said fins are in the form of a vane defining a passageway in fluid communication with a corresponding one of said outer channels.

7. The apparatus of claim 6, wherein said inlet has a generally circular cross section along said axis and said outlet has a generally symmetric, serpentine contour about said axis.

8. The apparatus of claim 6, wherein said mixer further includes several outer chutes each positioned between a corresponding pair of said inner chutes.

9. An apparatus, comprising:

a gas turbine engine operable to produce an exhaust flow;

a conduit coupled to said engine along an axis to mix the exhaust flow with cooling air, said conduit including a passage and a number of lobes each defining a corresponding one of several inner channels circumferentially disposed about said axis, said lobes each being shaped to turn a corresponding one of said inner channels about said axis as said corresponding one of said inner channels advances along said axis;

a number of fins each extending into said passage from a surface of said conduit and converging with one or more other of said fins as said axis is approached, and wherein one or more of said fins each include a passageway in fluid communication with a corresponding one of said outer channels.

10. The apparatus of claim 9, wherein said fins are each shaped to twist about said axis as said fins each extend along said axis.

11. The apparatus of claim 9, wherein said conduit defines a number of outer channels each positioned between a corresponding pair of said inner channels.

12. The apparatus of claim 11, wherein said passage includes an inlet to receive the exhaust flow and an outlet to discharge the exhaust flow, said outer channels turn about said axis with said inner channels, and said lobes each flare outward as said lobes each advance along said axis from said inlet to said outlet.

13. The apparatus of claim 9, wherein said engine includes a centerbody extending into said mixer through said inlet, and said passageway of each of said one or more fins is in fluid communication with an opening into said centerbody.

14. The apparatus of claim 9, wherein said inner channels twist about said axis to block view of said engine through said lobes from a view plane perpendicular to said axis, and downstream of said outlet and said fins are arranged in a spiral pattern at said outlet to at least partially block view through said passage from said view plane.

15. The apparatus of claim 9, further comprising an aircraft, said engine being coupled to said aircraft and being configured to propel said aircraft.

16. The apparatus of claim 9, wherein said lobes each include a different pair of a number of walls radially disposed about said axis, and said walls each separate a respective one of said inner channels from a respective one of said outer channels.

17. The apparatus of claim 9, wherein said fins are visible through an outlet of said passage.

18. An apparatus, comprising: a gas turbine engine operable to produce an exhaust flow and a mixer coupled to said engine along an axis to mix the exhaust flow with cooling air, said mixer including:

a passage positioned along said axis to convey said exhaust flow therethrough;

several inner chutes circumferentially disposed about said passage;

several outer chutes circumferentially disposed about said passage, said outer chutes each being positioned between a respective pair of said inner chutes; and a number of vanes each extending into said passage from an inner surface of said mixer, one or more of said vanes each including a passageway in fluid communication with a corresponding one of said outer chutes.

19. The apparatus of claim 18, wherein said passage includes an inlet opposite said outlet along said axis, said inner chutes each turn about said axis as said inner chutes each extend along said axis, and said inner chutes each open into said passage.

20. The apparatus of claim 18, further comprising an aircraft, said engine being coupled to said aircraft and being configured to propel said aircraft.

21. The apparatus of claim 18, wherein said inner chutes are each defined by a corresponding one of a number of lobes radially disposed about said passage, said lobes each include a different pair of a number of walls radially disposed about said axis.

22. The apparatus of claim 21, wherein said vanes are radially disposed about said axis.

23. The apparatus of claim 21, wherein said lobes each have a helical shape rotating at least 15 degrees about said axis as said lobes each extend along said axis.

24. The apparatus of claim 18, wherein said engine includes a centerbody extending into said mixer, and said passageway of each of said one or more vanes is in fluid communication with a plenum in said centerbody.

\* \* \* \* \*